US007840808B2

(12) United States Patent
Takamizawa et al.

(10) Patent No.: US 7,840,808 B2
(45) Date of Patent: Nov. 23, 2010

(54) AUTHENTICATION SYSTEM, DEVICE, AND PROGRAM

(75) Inventors: Hidehisa Takamizawa, Fuchu (JP); Koji Okada, Tokyo (JP); Tatsuro Ikeda, Fuchu (JP); Tomoaki Morijiri, Mitaka (JP); Asahiko Yamada, Tokorozawa (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 1046 days.

(21) Appl. No.: 11/552,299

(22) Filed: Oct. 24, 2006

(65) Prior Publication Data

US 2007/0094501 A1    Apr. 26, 2007

(30) Foreign Application Priority Data

Oct. 25, 2005  (JP)  ............................. 2005-310055
Oct. 4, 2006   (JP)  ............................. 2006-273134

(51) Int. Cl.
    *H04L 9/32*   (2006.01)
(52) U.S. Cl. .............................. 713/170; 726/1; 726/4; 726/30
(58) Field of Classification Search ......... 713/168–174, 713/182–186, 189; 726/2–8, 4, 30; 709/229, 709/225
    See application file for complete search history.

(56) References Cited

U.S. PATENT DOCUMENTS

| 7,200,753 | B1 * | 4/2007 | Shinzaki et al. ............. 713/182 |
| 2003/0064718 | A1 * | 4/2003 | Haines et al. ............... 455/423 |
| 2004/0088587 | A1 * | 5/2004 | Ramaswamy et al. ....... 713/202 |
| 2004/0172535 | A1 * | 9/2004 | Jakobsson et al. .......... 713/168 |
| 2005/0055557 | A1 * | 3/2005 | Yamada et al. ............. 713/186 |
| 2006/0005025 | A1 * | 1/2006 | Okada et al. ............... 713/168 |
| 2008/0098469 | A1 * | 4/2008 | Morijiri et al. .............. 726/5 |
| 2008/0172729 | A1 * | 7/2008 | Takamizawa et al. ......... 726/7 |

FOREIGN PATENT DOCUMENTS

| JP | 2005-199189 | 7/2005 |
| JP | 2006-11768 | 1/2006 |
| WO | WO 2007/007690 A1 | 1/2007 |

OTHER PUBLICATIONS

Okada, K. et al.; Extensible Personal Authentication Framework using Biometrics and PKI; Toshiba Solutions Corp.; IWAP 2004.*
Koji Okada, et al., "Extensible Personal Authentication Framework using Biometrics and PKI", Pre Proceedings of the 3$^{rd}$ International Workshop for Applied PKI (IWAP), Oct. 6, 2004, 12 Pages.
Hidehisa Takamizawa, et al., "Biometric Authentication Context", Special Reports, Toshiba Review, vol. 60, No. 6, 2005, 4 Pages.

* cited by examiner

*Primary Examiner*—Matthew B Smithers
*Assistant Examiner*—Jing Sims
(74) *Attorney, Agent, or Firm*—Oblon, Spivak, McClelland, Maier & Neustadt, L.L.P.

(57) ABSTRACT

A client device transmits service identification information to an authentication device at the time of a service request, prompts selection of one or more authentication entity devices which execute one or more authentication subprocesses from among all the authentication entity devices adaptive to profile information received from the authentication device, based on "function list information defining an execution environment of each of the authentication entity devices", transmits a request for executing an authentication subprocess to such selected each authentication entity device, and transmits to the authentication device "authentication context information including an execution environment and an execution result of an authentication subprocess" received from such each authentication entity device.

6 Claims, 35 Drawing Sheets

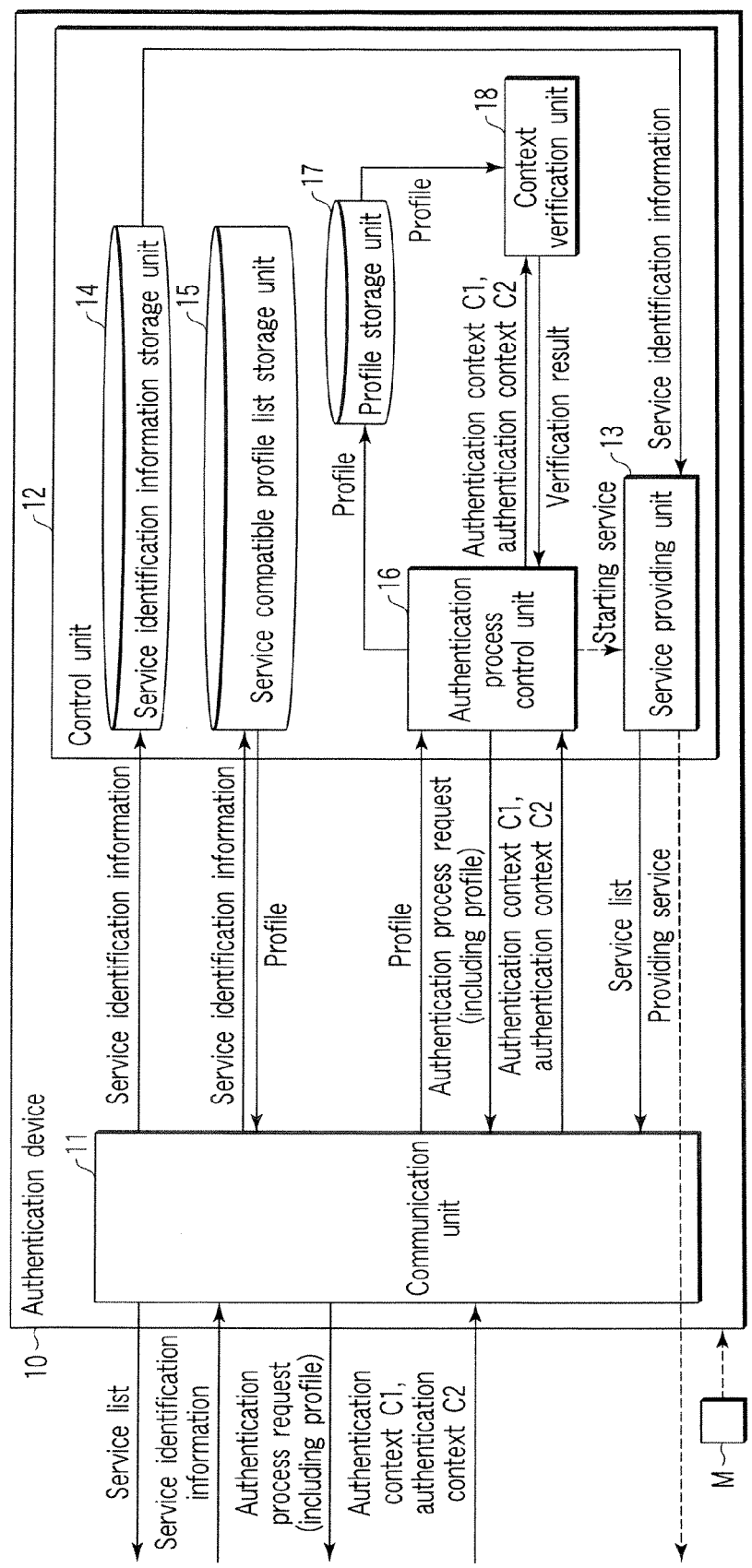
F I G. 2

FIG. 5

Service compatible profile list

| Security of matching device | Service A acceptable profile | Service B acceptable profile | Service C acceptable profile |
|---|---|---|---|
| Security of matching device | 70 points or more | 80 points or more | 90 points or more |
| Quality of matching device | 70 points or more | 80 points or more | 90 points or more |
| Matching algorithm | Algorithm "a" | Algorithm "a" | Algorithm "b" |
| Matching parameter | Parameter A | Parameter B | Parameter C |
| Security of biometric template | 80 points or more | 80 points or more | 80 points or more |
| Quality of biometric template | 80 points or more | 80 points or more | 80 points or more |
|  | Profile A | Profile B | Profile C |

| Service compatible profile list | | |
|---|---|---|
| | Service A acceptable profile | Service B acceptable profile |
| Security of matching device | 70 points or more | 80 points or more |
| Quality of matching device | 70 points of more | 80 points or more |
| Matching algorithm | Algorithm "a" | Algorithm "a" |
| Matching parameter | Parameter A | Parameter B |
| Security of biometric template | 80 points or more | 80 points or more |
| Quality of biometric template | 80 points or more | 80 points or more |
| | Profile A | Profile C |

Profile B (center column): 75 points or more, 75 points or more, Algorithm "a", Parameter A, 80 points or more, 80 points or more

FIG. 6

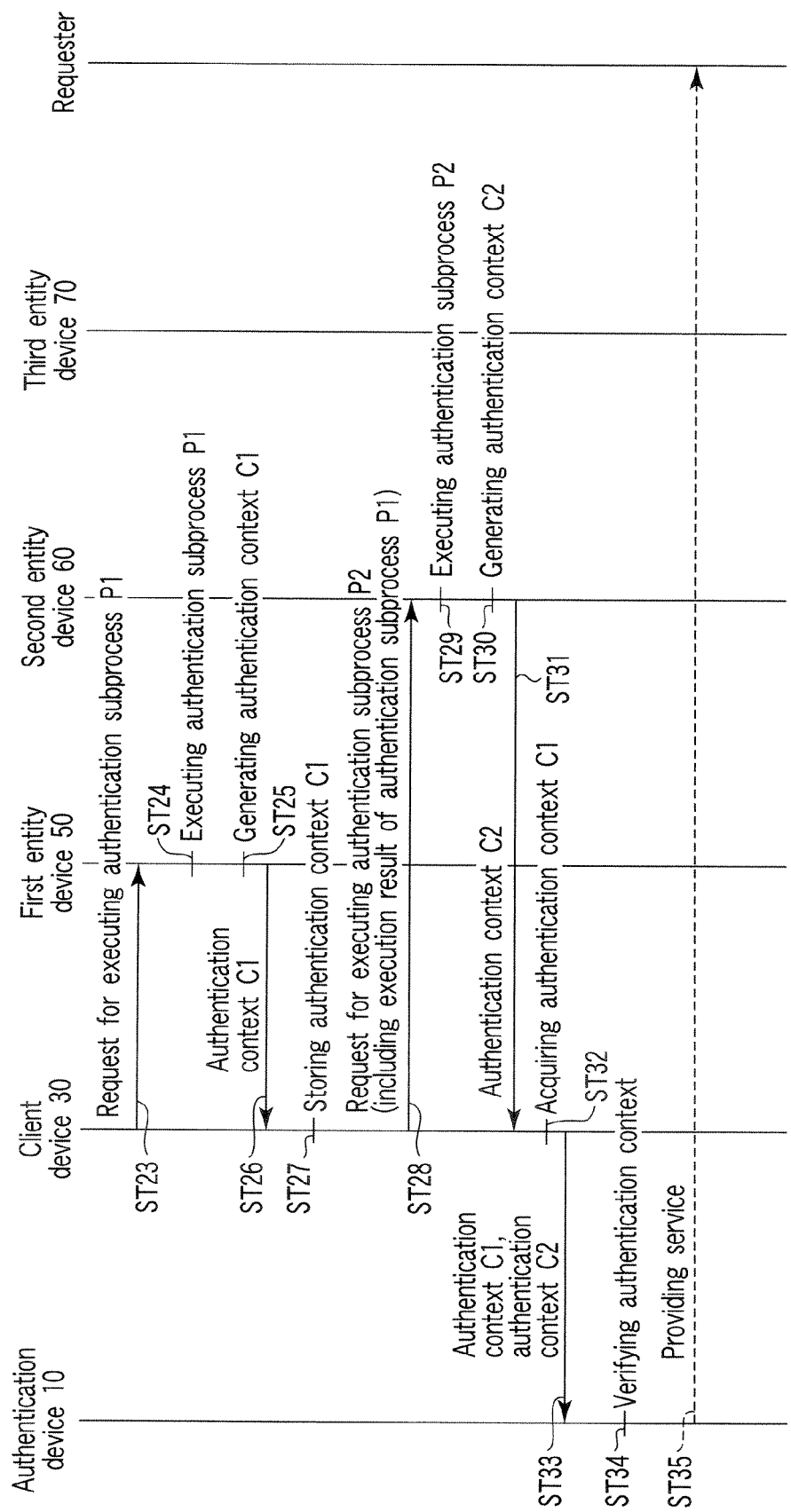
F I G. 14

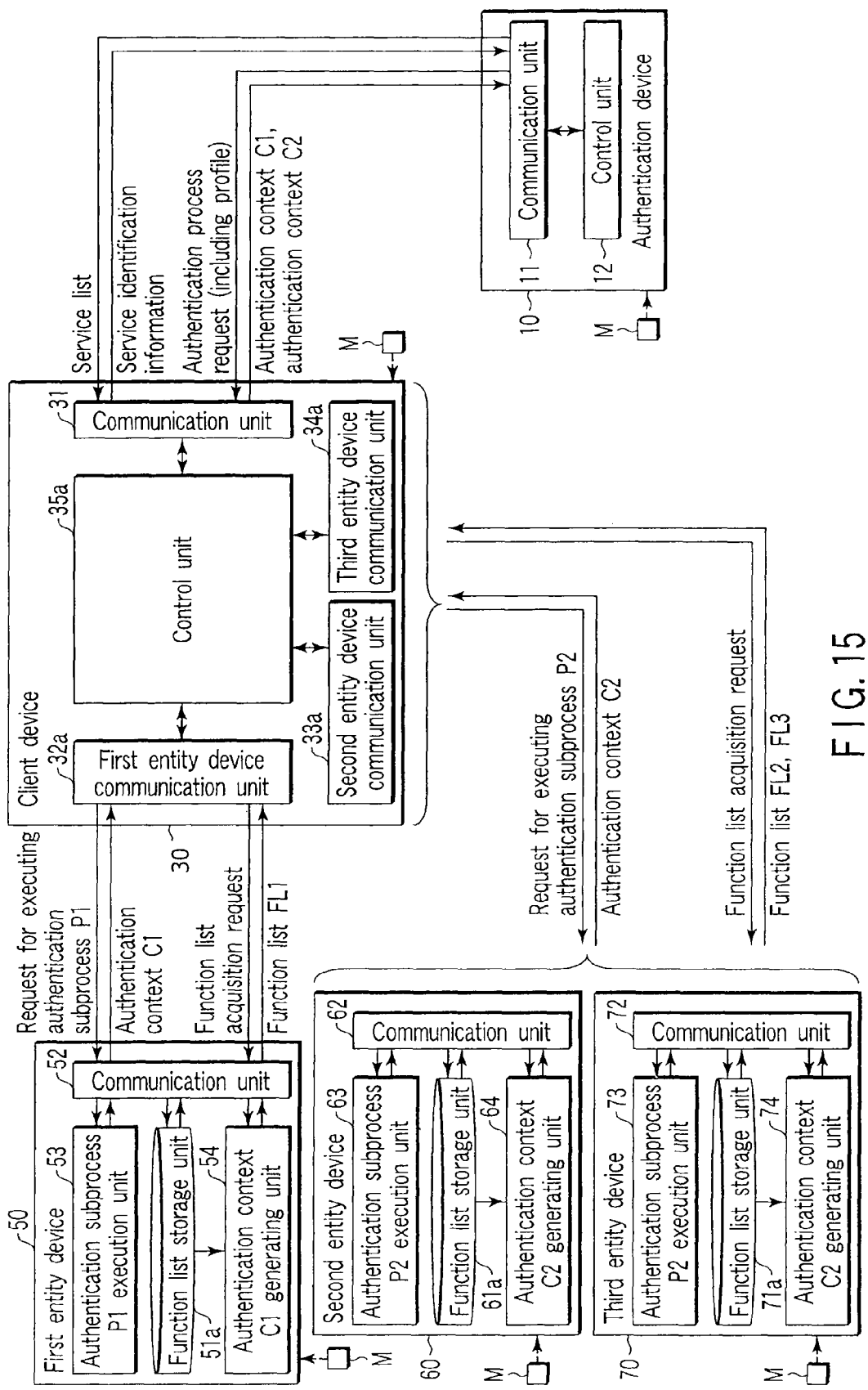
F I G. 15

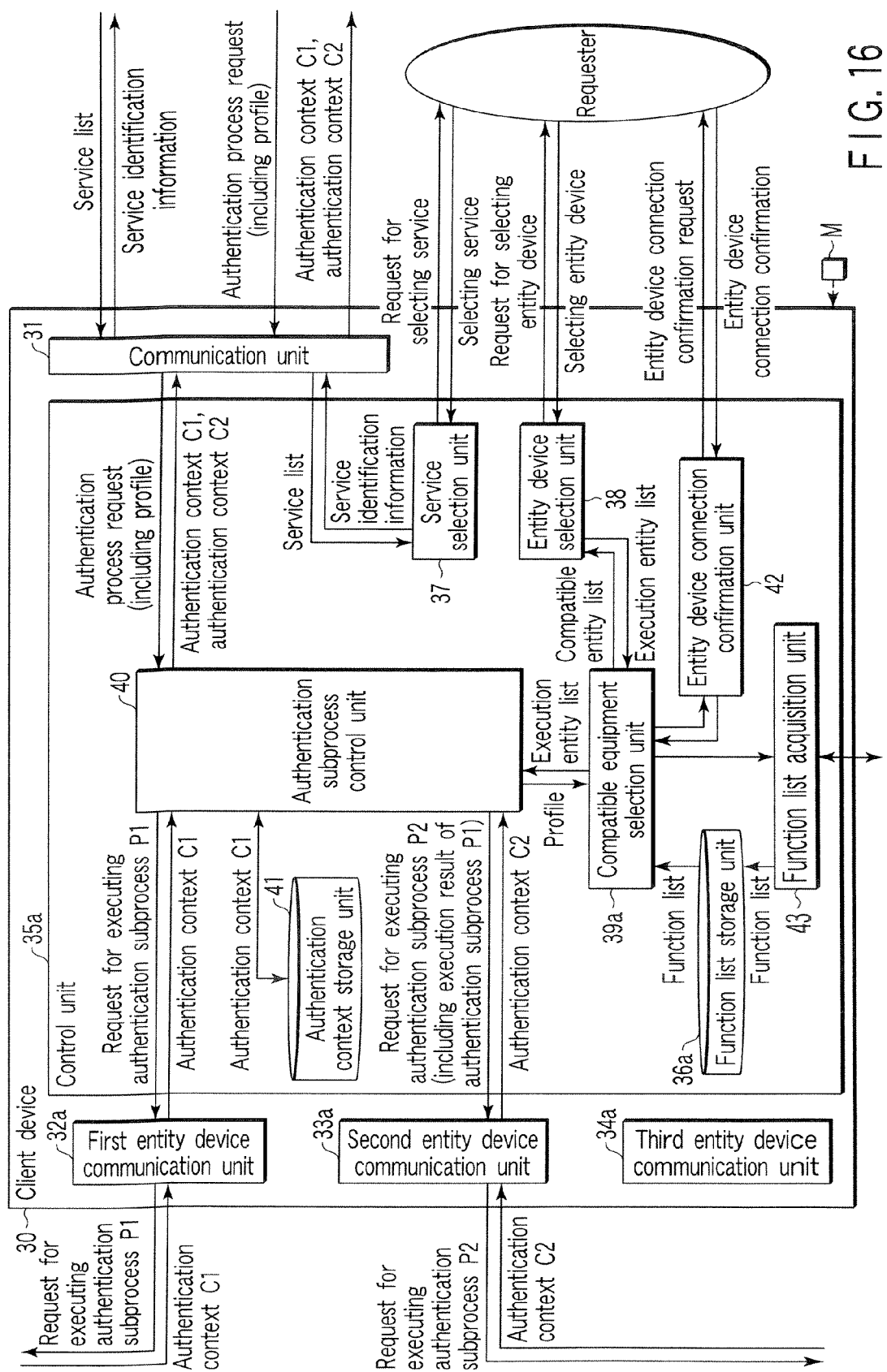
F I G. 16

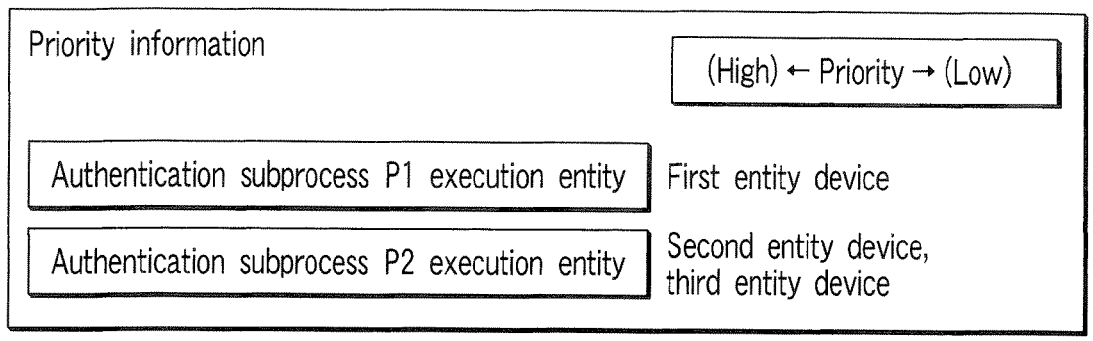
F I G. 20
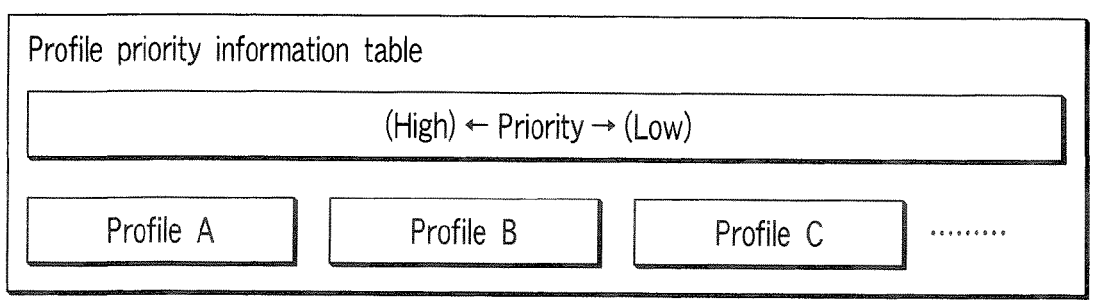
F I G. 21

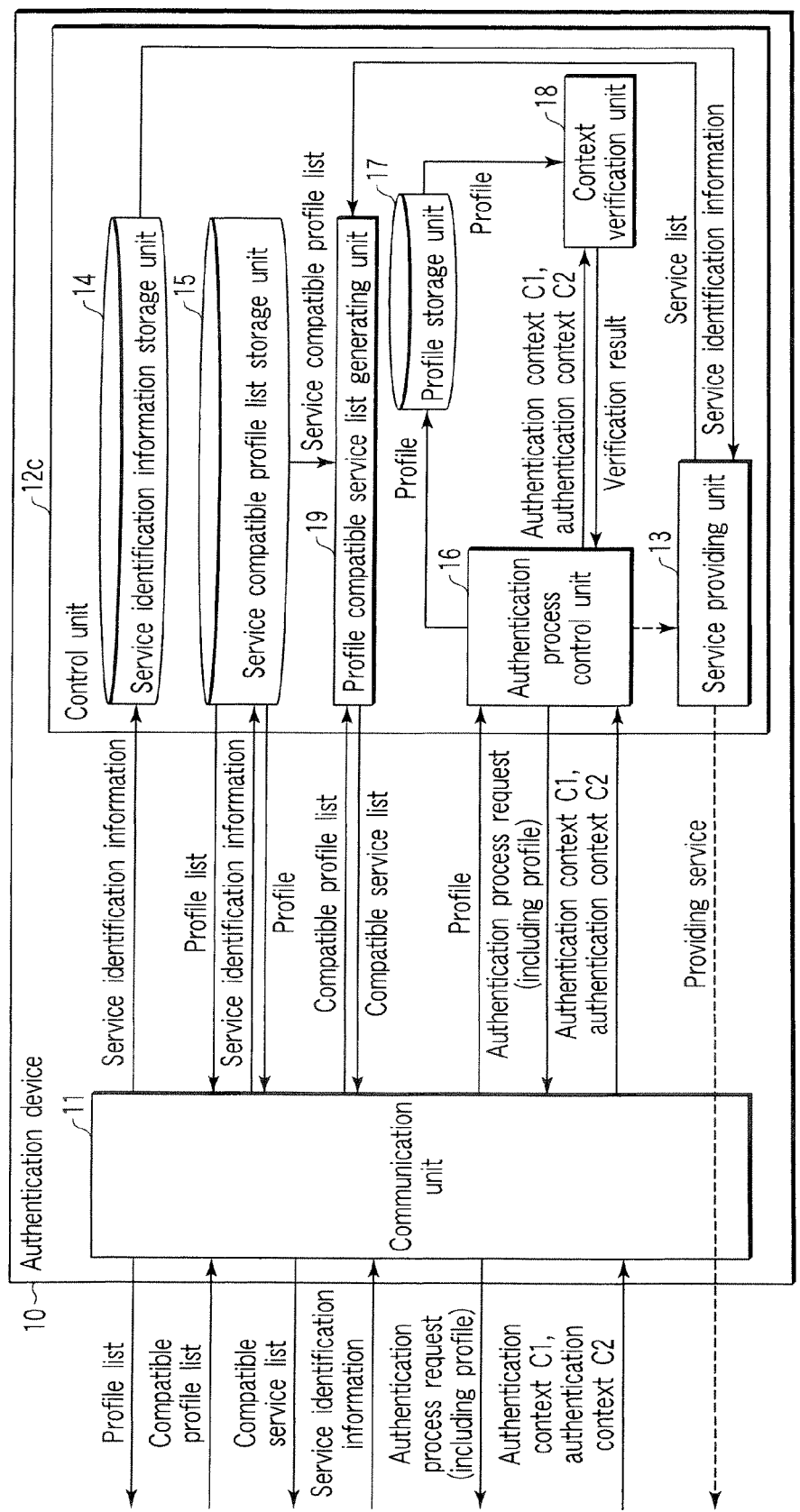
F I G. 24

| | Profile A | Profile B | Profile C |
|---|---|---|---|
| Security of matching device | 70 points or more | 80 points or more | 90 points or more |
| Quality of matching device | 70 points of more | 80 points or more | 90 points or more |
| Matching algorithm | Algorithm "a" | Algorithm "a" | Algorithm "b" |
| Matching parameter | Parameter A | Parameter B | Parameter C |
| Security of biometric template | 80 points or more | 80 points or more | 80 points or more |
| Quality of biometric template | 80 points or more | 80 points or more | 80 points or more |

Profile list

F I G. 26

Compatible profile list

| | Profile A | Profile B |
|---|---|---|
| Security of matching device | 70 points or more | 80 points or more |
| Quality of matching device | 70 points of more | 80 points or more |
| Matching algorithm | Algorithm "a" | Algorithm "a" |
| Matching parameter | Parameter A | Parameter B |
| Security of biometric template | 80 points or more | 80 points or more |
| Quality of biometric template | 80 points or more | 80 points or more |

F I G. 27

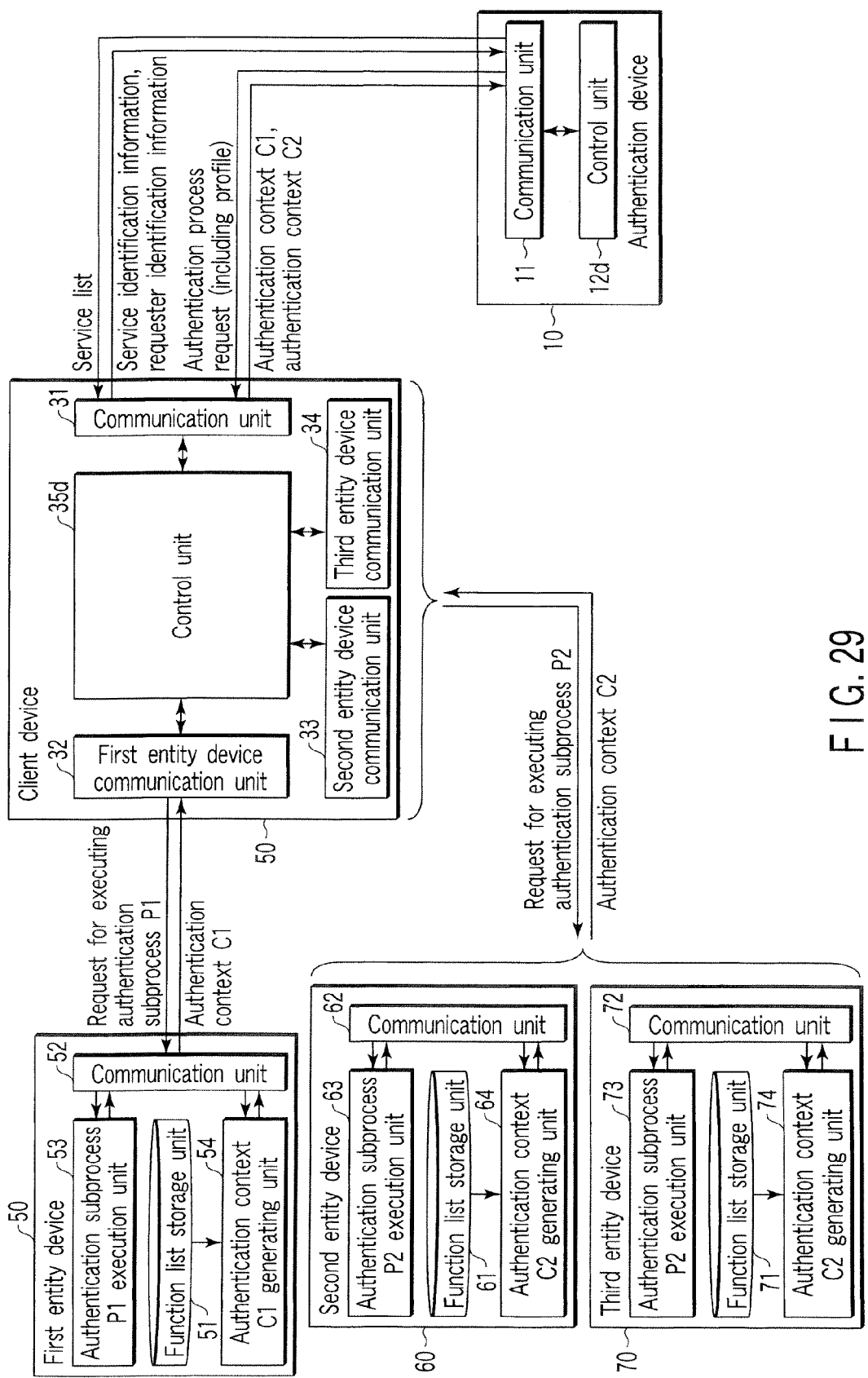
F I G. 29

FIG. 32

| Requester-based service compatible profile list | | | |
|---|---|---|---|
| | Service A acceptable profile | Service B acceptable profile | Service C acceptable profile |
| First requester | | | |
| Security of matching device | 80 points or more | 80 points or more | 90 points or more |
| Quality of matching device | 80 points of more | 80 points or more | 90 points or more |
| Matching algorithm | Algorithm "a" | Algorithm "a" | Algorithm "b" |
| Matching parameter | Parameter A | Parameter B | Parameter C |
| Security of biometric template | 80 points or more | 80 points or more | 80 points or more |
| Quality of biometric template | 80 points or more | 80 points or more | 80 points or more |
| | Profile A | Profile B | Profile C |
| ...... | ...... | ...... | ...... |
| N-th requester | | | |
| Security of matching device | 70 points or more | 80 points or more | 90 points or more |
| Quality of matching device | 70 points of more | 80 points or more | 90 points or more |
| Matching algorithm | Algorithm "a" | Algorithm "a" | Algorithm "b" |
| Matching parameter | Parameter A | Parameter B | Parameter C |
| Security of biometric template | 80 points or more | 80 points or more | 80 points or more |
| Quality of biometric template | 80 points or more | 80 points or more | 80 points or more |
| | Profile A | Profile B | Profile C |

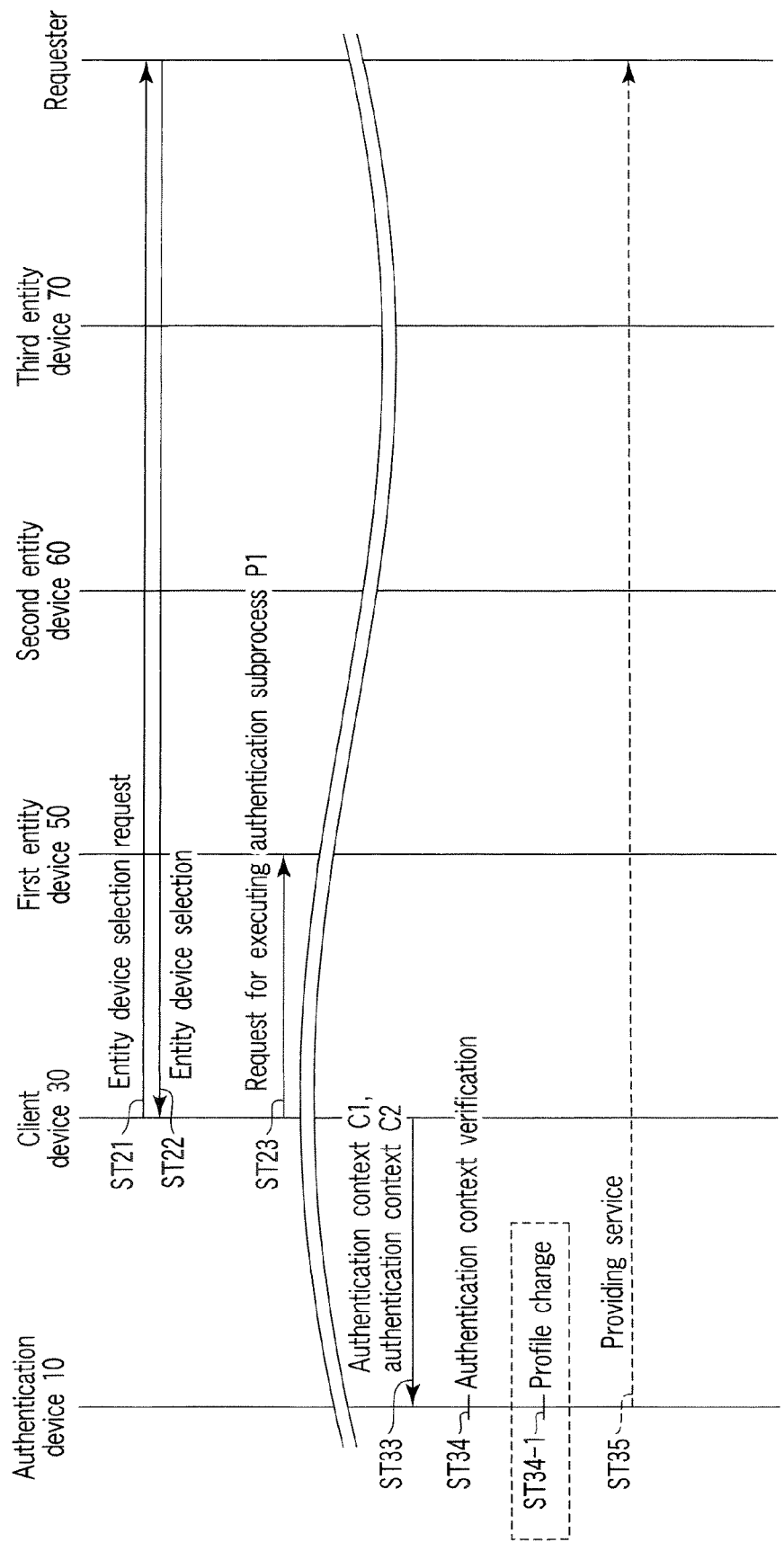
F I G. 34

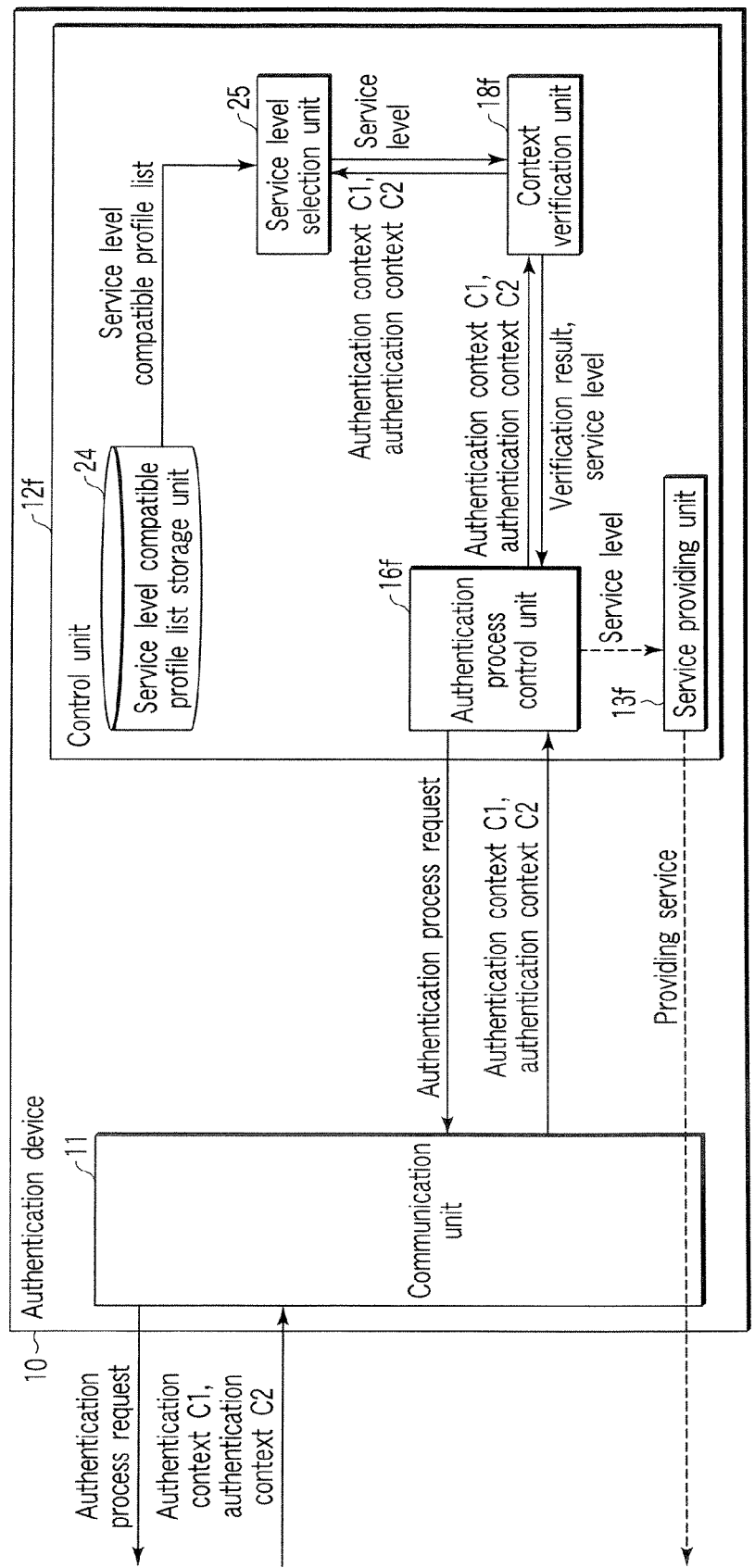
F I G. 36

Service level compatible profile list

| Service level | Acceptable profile | | |
|---|---|---|---|
| | 3, | 6, | 9, |
| Security of matching device | 70 points or more | 80 points or more | 90 points or more |
| Quality of matching device | 70 points or more | 80 points or more | 90 points or more |
| Matching algorithm | Algorithm "a" | Algorithm "a" | Algorithm "b" |
| Matching parameter | Parameter A | Parameter B | Parameter C |
| Security of biometric template | 80 points or more | 80 points or more | 80 points or more |
| Quality of biometric template | 80 points or more | 80 points or more | 80 points or more |
| | Profile A | Profile B | Profile C |

F I G. 38

AUTHENTICATION SYSTEM, DEVICE, AND PROGRAM

CROSS-REFERENCE TO RELATED APPLICATIONS

This application is based upon and claims the benefit of priority from prior Japanese Patent Applications No. 2005-310055, filed Oct. 25, 2005; and No. 2006-273134, filed Oct. 4, 2006, the entire contents of both of which are incorporated herein by reference.

BACKGROUND OF THE INVENTION

1. Field of the Invention

The present invention relates to an authentication system, device, and program using a biometrics technique, for example, an authentication system, device, and program capable of improving convenience of biometric authentication in an open network environment utilizing the Internet or the like.

2. Description of the Related Art

Conventionally, an authentication technique of authenticating a communication party has been an important element when achieving communication or service via a network. In recent years, with prevalence of an open network environment or with development of federation technologies of distributed service resources, a communication party targeted for authentication has been extended up to a range including a person to a use equipment terminal.

In general, when executing authentication, strictly identifying or matching an authentication target can be exemplified as a requirement. At this time, in the case where the authentication target is an individual, there is a need for a principal confirmation technique for strictly confirming whether or not the individual is a principal.

At present, biometrics (biometric matching/authentication technique) can be exemplified as a promising technique that carries out principal confirmation. The biometrics is provided as a technique of matching specific physical/behavioral characteristics or properties that the individuals have with biometrics information registered in advance (hereinafter, biometric template), and then, confirming whether or not the individual is a principal. As biometric information, there are utilized a fingerprint, an iris, a face, a voice, a keystroke, a signature and the like.

In the biometrics, unlike an existing authentication method such as a password, a user's load is reduced because biometric information of which there is no worrying about a loss or forgetting is utilized. In addition, the biometric information presumes that it is difficult to duplicate the information, and is effective to prevent a user spoofing or the like.

However, in biometric authentication, unlike password authentication, a matching result is greatly influenced by an execution environment. For example, with respect to the matching result of password authentication, whether or not the individual is a principal is alternatively expressed regardless of an execution environment of use equipment such as a touch panel or a keyboard. In contrast, with respect to the matching result of biometric authentication, whether or not the individual is a principal is expressed by a specified threshold value in response to a scale such as similarity indicating whether or not the individual resembles a principal. This scale is greatly influenced by an execution environment such as a type of biometric information, precision of a matching device and the like, and a value fluctuates. Thus, in a stationary system in which a predetermined environment can be allocated, there is no significant inconvenience in particular.

However, in an open system in which a user's matching environment cannot be constantly allocated, it is deemed to be necessary for a verifier to judge whether authentication is enabled or disabled in accordance with a biometric environment that a requester has, as well as the matching result.

An authentication system using an authentication context represented by Biometric Authentication Context is known as a technique that meets this requirement. For example, reference should be made to Koji Okada, Tatsuro Ikeda, Hidehisa Takamizawa, Toshiaki Saisho, Extensible Personal Authentication Framework using Biometrics and PKI, Pre-Proceedings of The 3rd International workshop for Applied PKI (IWAP2004), pp. 96-107 (hereinafter, referred to as reference 1). Authentication Context is provided as a technique in which a management subject (entity device) that executes each subprocess configuring principal confirmation assures its execution result, thereby making it possible for a verifier to verify validity of the execution result of each subprocess.

In addition, in the technique described in reference 1, a requester's execution environment in which authentication is executed is expressed by a profile, thereby judging whether authentication is enabled or disabled in accordance with a client's biometric environment. The profile used here designates information that specifies an execution environment such as a combination of management subjects that execute principal confirmation, a subprocess executed by each management subject, security enforcement specification between management subjects, a security enforcement rule (including a security level) and the like.

However, according to discussion of the Inventor, in an open system using arbitrary equipment or a public line such as a user of a personal computer (hereinafter, referred to as a PC), even if there is used an authentication system or the like using an authentication context represented by Biometric Authentication Context, there occurs a problem that convenience and adaptability are low, as described below.

The following first to sixth problems are individually described with respect to a case in which convenience and adaptability are low, and all of the problems may not always have to be solved at the same time. Low convenience includes inconvenience for users. Low adaptability includes inconvenience that an authentication system is not adaptive to an arbitrary user's environment.

In addition, these problems each assume a situation in which, when providing service based on a request received from an unspecified number of users via a network, it is judged whether authentication is enabled or disabled in accordance with an unspecified number of matching devices (hereinafter, also referred to as an entity device) connected to the users' personal computers.

(First Problem)

The first problem is that, in a requester's execution environment, in the case where there exist a plurality of entity devices that conform to one profile, an entity device for use in authentication cannot be determined from the plurality of entity devices.

For example, consider that the requester's biometric environment comprises an entity device available from company A having a fingerprint matching function and an entity device available from company B having a face matching function and that both of the entity devices conform to profile requested by a verifier. In this case, it is impossible to determine which entity device is to be used.

Therefore, in the requester's execution environment, in the case where there exist a plurality of entity devices that conform to one profile, biometric authentication lies in a situation in which convenience and adaptability are low.

(Second Problem)

The second problem is that, in addition to the first problem, in the case where mounting or demounting of an entity device occurs, the entity device for use in authentication cannot be dynamically selected.

For example, in the case where an entity device that conforms to a profile which verifier requests is not connected, a requester cannot continue authentication. In this case, it is desirable to notify the fact to the requester, and connect a necessary entity device, thereby making it possible to continue authentication.

Therefore, in the case where mounting or demounting of the entity device occurs as well, biometric authentication lies in a situation in which convenience and adaptability are low.

(Third Problem)

The third problem is that, in addition to the first problem, further, an entity device used in a semi-automatic manner cannot be selected in consideration of a requester's convenience. Namely, in the case where there exist a plurality of entity devices that conform to one profile, there is a possibility that it is inefficient, in terms of convenience, for the requester to select an entity device every time.

For example, in biometric authentication, properties greatly differ depending on modalities (types of biometric information), and adaptabilities may greatly differ depending on requesters. For example, a person with a dry skin is not adaptive to fingerprint authentication.

Therefore, if the requester selects an entity device every time, in the case where efficiency is considered to be poor yet, biometric authentication lies in a situation in which convenience and adaptability are low.

(Fourth Problem)

The fourth problem is that, in the case where there exist a plurality of services which a verifier provides to a requester, and then, profiles different depending on the services are associated, the verifier cannot present services that can be provided in response to the requester's execution environment.

For example, consider that the verifier provides a number of services, but there exists only one type of service that can be provided in response to the requester's execution environment. The verifier cannot present a service that can be provided, thus making it impossible for the requester to judge a compatible service.

In this case, when the requester has requested a certain service, the requester's environment does not correspond to a profile that corresponds to that service, and there is a high possibility that there occurs a circumstance in which authentication cannot be executed. This circumstance is inconvenient for the requester, and the verifier makes the requester feel inconvenient. Thus, the above circumstance is inconvenient for both parties.

Therefore, in the case where there exist a plurality of services for the verifier to provide to the requester, and profiles different depending on the services are associated as well, biometric authentication lies in a situation in which convenience and adaptability are low.

(Fifth Problem)

The fifth problem is that, in the case where biometric authentication is used for a certain service, a profile corresponding to a security level that a requester desires cannot be set with respect to that service.

For example, consider a service that enables utilization of individual properties according to an authentication result, like a settlement request in transfer service in online banking or in online shopping.

In service of this type, although a requester having high security consciousness has used an entity device having a high security level while desiring stricter authentication, a security level that is lower than that of the requester's entity device is specified in a verifier's profile. In this case, there is a possibility that a third party illegally succeeds in authentication by using an entity device having a low security level.

Therefore, in the case where desired security levels are different from each other between the requester and the verifier as well, biometric authentication lies in a situation in which convenience and adaptability are low.

(Sixth Problem)

The sixth problem is that, for example, in the case where profiles are different depending on a transfer amount limit level in online banking service, a requester must select a level of an amount limit and an entity device according to that level every time authentication is carried out.

In this case, for example, it is considered to be desirable from an aspect of a requester's convenience that, in an entity device having a low security level attached to a portable cellular phone, service with a low amount limit is automatically selected; and that in an entity device having a high security level attached to ATM (automatic teller machine), service with a high amount limit can be automatically provided.

Therefore, in the case where profiles are different depending on service levels, biometric authentication lies in a situation in which convenience and adaptability are low.

BRIEF SUMMARY OF THE INVENTION

It is an object of the present invention to provide an authentication system, device, and program capable of authenticating an arbitrary user using biometrics by means of an arbitrary entity device and improving convenience and adaptability at the time of providing service in an open network environment.

A first aspect of the present invention is an authentication system comprising: a plurality of authentication entity devices capable of individually executing authentication subprocesses, each of which configures a biometric authentication processing operation; a client device to which said each authentication entity device is to be connected; and an authentication device communicable with the client device in an open network environment, the authentication device comprises: a service compatible profile storage module configured to store profile information defining an execution environment acceptable to each service by service identification information indicating each service; a profile transmitting module configured to transmit to the client device the corresponding profile information in the service compatible profile storage module, based on the service identification information received from the client device; an authentication context receiving module configured to receive from the client device, authentication context information including an execution environment and an execution result of the authentication subprocess; a context verification module configured to verify whether or not the authentication context information is acceptable, based on the transmitted profile information; and a service providing module configured to execute a service providing processing operation compatible with the received service identification information when it is indicated that the verification result is acceptable, the client device comprises: a function list storage module having stored therein a function list information defining an execution environment of said each authentication entity device; a service request module configured to transmit service identification information to the authentication device when a service is requested; a profile receiving module configured to receive profile information from the authentication device; a compatible device selection module configured to select all authentication entity devices adaptive to the received profile information, based on the function list information; an entity device selection module configured to prompt selection of authentication entity devices each of which executes one or more the authentication subprocesses from among all of the authentication entity devices selected by the compatible device selection module; an authentication subprocess control module configured to transmit an request for executing the authentication subprocess with respect to said each authentication entity device selected by the entity device selection module; and a context transmitting module configured to, when receiving authentication context information that includes an execution environment and an execution result of an authentication subprocess from said each authentication entity device, transmit said each authentication context information to the authentication device, and said each entity device comprises: an authentication subprocess execution module configured to, when receiving a request for executing an authentication subprocess from the client device, execute the authentication subprocess; an authentication context generating module configured to generate authentication context information that includes an execution environment and an execution result of the executed authentication subprocess; and a context transmitting module configured to transmit the generated authentication context information to the client device.

A second aspect of the present invention is the authentication system according to the first aspect, wherein said each authentication entity device further comprises: a function list storage module having stored therein in advance function list information on one's own module; and a function list transmitting module configured to transmit function list information in the function list storage module to the client device when receiving a function list acquisition request from the client device, and the client device further comprises: a module configured to prompt confirmation of whether or not an authentication entity device is newly connected prior to selection by the compatible device selection module when receiving profile information by the profile receiving module; a function list acquisition request module configured to transmit a function list acquisition request to all of newly connected authentication entity devices; and a function list writing module configured to, when receiving function list information in response to transmission of the function list acquisition request, write the function list information into the function list storage module.

A third aspect of the present invention is an authentication system comprising: a plurality of authentication entity devices capable of individually executing authentication subprocesses, each of which configures a biometric authentication processing operation; a client device to which said each authentication entity device is to be connected; and an authentication device communicable with the client device in an open network environment, the authentication device comprises: a service compatible profile storage module configured to store profile information defining an execution environment acceptable to each service by service identification information indicating each service; a profile transmitting module configured to transmit to the client device the corresponding profile information in the service compatible profile storage module, based on the service identification information received from the client device; an authentication context receiving module configured to receive from the client device, authentication context information including an execution environment and an execution result of the authentication subprocess; a context verification module configured to verify whether or not the authentication context information is acceptable, based on the transmitted profile information; and a service providing module configured to execute a service providing processing operation compatible with the received service identification information when it is indicated that the verification result is acceptable, the client device comprises: a function list storage module having stored therein a function list information defining an execution environment of said each authentication entity device; a service request module configured to transmit service identification information to the authentication device when a service is requested; a profile receiving module configured to receive profile information from the authentication device; a compatible device selection module configured to select all authentication entity devices adaptive to the received profile information, based on the function list information; a priority information storage module configured to store priority information that indicates a selected priority by said each authentication entity device; an entity device determination module configured to select authentication entity devices, based on priority information in the priority information storage module from among all of the authentication entity devices selected by the compatible device selection module; an authentication subprocess control module configured to transmit an request for executing the authentication subprocess with respect to said each authentication entity device determined by the entity device determination module; and a context transmitting module configured to, when receiving authentication context information that includes an execution environment and an execution result of an authentication subprocess from said each authentication entity device, transmit said each authentication context information to the authentication device, and said each entity device comprises: an authentication subprocess execution module configured to, when receiving a request for executing an authentication subprocess from the client device, execute the authentication subprocess; an authentication context generating module configured to generate authentication context information that includes an execution environment and an execution result of the executed authentication subprocess; and a context transmitting module configured to transmit the generated authentication context information to the client device.

A fourth aspect of the present invention is the authentication system according to any one of the first to third aspects, wherein the authentication device further comprises: a compatible profile transmitting module configured to transmit to the client device all of profile information in the service compatible profile storage module before receiving the service identification information from the client device; a compatible profile receiving module configured to receive profile information compatible with an execution environment from the client device; and a corresponding profile information transmitting module configured to transmit to the client device the corresponding profile information and service identification information in the service compatible profile storage module, based on the profile information received from the client device, and the client device further comprises: a module configured to receive all of profile information transmitted from the compatible profile module; a module configured to return to the authentication device profile information compatible with an execution environment indicated by function list information in the function list storage module, from among all of the received profile information; a module configured to receive corresponding profile information and service identification information from the corresponding profile transmitting module; and a module configured to prompt selection of service identification information to be transmitted to the authentication device, based on the received corresponding profile information and service identification information.

A fifth aspect of the present invention is the authentication system according to the first aspect, wherein the service compatible profile storage module stores the service identification information and the profile information to be associated with each other by requester identification information indicating a requester; the profile transmitting module transmits to the client device the corresponding profile information in the service compatible profile storage module, based on the requester identification information and service identification information received from the client device; the service request module transmits requester identification information and service identification information to the authentication device when the service is requested; and the authentication device further comprises: a profile information generating module configured to generate profile information defining an execution environment included in the authentication context, based on the authentication context information when it is indicated that a verification result by the context verification module is acceptable; and a profile update module configured to update the corresponding profile information in the service compatible profile storage module to the generated profile information, based on the requester identification information and service identification information received from the client device.

A sixth aspect of the present invention is an authentication system comprising: a plurality of authentication entity devices capable of individually executing authentication subprocesses, each of which configures a biometric authentication processing operation; a client device to which said each authentication entity device is to be connected; and an authentication device communicable with the client device in an open network environment, the authentication device comprises: a service level compatible profile storage module configured to store profile information defining an execution environment acceptable at each service level by service level identification information indicating a service level; an authentication process request module configured to transmit an authentication process request to the client device; an authentication context receiving module configured to receive authentication context information including an execution environment and an execution result of the authentication subprocess from the client device; a context verification module configured to verify whether or not the authentication context information is acceptable based on profile information in the service level compatible profile storage module; a service level selection module configured to select a highest service level from among service levels compatible to the corresponding profile information in the service level compatible profile storage module, based on profile information included in said each authentication context when the verification result is acceptable; and a level compatible service providing module configured to execute a service providing processing operation compatible to the selected service level, the client device comprises: a process request receiving module configured to receive the authentication process request; a device selecting module configured to prompt selection of authentication entity devices each of which executes one or more the authentication subprocesses; an authentication subprocess control module configured to transmit a request for executing the authentication subprocess to said each authentication entity device selected by the device selecting module; and a context transmitting module configured to, when receiving authentication context information that includes an execution environment and an execution result of an authentication subprocess from said each authentication entity device, transmit said each authentication context information to the authentication device, and said each entity device comprises: an authentication subprocess execution module configured to, when receiving a request for executing an authentication subprocess from the client device, execute the authentication subprocess; an authentication context generating module configured to generate authentication context information including an execution environment and an execution result of the executed authentication subprocess; and a context transmitting module configured to transmit the generated authentication context information to the client device.

In the first aspect, with a configuration in which the client device prompts a user to select an authentication entity device that execute each authentication subprocess, even in the case where there exist the plurality of entity devices that conform to one profile in a user's execution environment, it becomes possible to determine an entity device for use in authentication processing.

Therefore, at the time of providing service in the open network environment, the arbitrary user can be authenticated using biometrics by means of the arbitrary entity device, and convenience and adaptability can be improved.

In the second aspect, in addition to the working of the first aspect, with a configuration in which the client device prompts a user to confirm whether or not to newly connect an authentication entity device, even in the case where mounting or demounting of an entity device occurs as well, convenience and adaptability can be improved.

In the third aspect, in addition to the working of the first or second aspect, a requester can preset a priority with respect to an entity device that executes an authentication subprocess and can select an entity device used in a semi-automatic manner. Thus, the requester's convenience at the time of executing authentication can be remarkably improved. In addition, even if the requester selects an entity device every time, in the case where efficiency is poor yet, convenience and adaptability can be improved.

In the fourth aspect, in addition to the working of each of the first to third aspects, with a configuration in which the authentication device transmits all of profile information to the client device; receives profile information that corresponds to an execution environment from the client device; and transmits the corresponding profile information to the client device based on the thus received profile information, only service that a verifier can respond to a requester's demand can be provided, and the requester can select only compatible service.

Therefore, in the case where there exist the plurality of services which the verifier provides to the requester, and profiles different depending on services are associated as well, convenience and adaptability can be improved.

In the fifth aspect, in addition to the working of the first aspect, the authentication device stores profile information that corresponds to the requester's identification information and service identification information, and then, updates the thus stored profile information to profile information having specified an execution environment including an authentication context after verifying the authentication context. In this manner, security level the requester desires can be set with respect to authentication.

Therefore, in the case where the desired security levels are different from each other between the requester and the verifier as well, convenience and adaptability can be improved.

In the sixth aspect, the authentication device selects the highest service level from among the service levels that correspond to the corresponding profile information, based on the profile information included in each authentication context. Thus, in the case where profiles are different depending on service levels as well, convenience and adaptability can be improved.

BRIEF DESCRIPTION OF THE SEVERAL VIEWS OF THE DRAWING

FIG. 2 is a schematic view depicting a configuration of an authentication device in the embodiment;

FIG. 5 is a schematic view depicting an example of a service compatible profile list in the embodiment;

FIG. 6 is a schematic view depicting a modified example of the service compatible profile list in the embodiment;

FIG. 14 is a sequence chart for explaining an operation in the embodiment;

FIG. 15 is a schematic view depicting a configuration of an authentication system according to a second embodiment of the present invention;

FIG. 16 is a schematic view depicting a configuration of a client device in the embodiment;

FIG. 20 is a schematic view depicting an example of priority information in the embodiment;

FIG. 21 is a schematic view depicting a modified example of the priority information in the embodiment;

FIG. 24 is a schematic view depicting a configuration of an authentication device in the embodiment;

FIG. 26 is a schematic view depicting an example of a profile list in the embodiment;

FIG. 27 is a schematic view depicting an example of a compatible profile list in the embodiment;

FIG. 29 is a schematic view depicting a configuration of an authentication system according to a fifth embodiment of the present invention;

FIG. 32 is a schematic view depicting an example of a requester-based service compatible profile list in the embodiment;

FIG. 34 is a sequence chart for explaining an operation in the embodiment;

FIG. 36 is a schematic view depicting a configuration of an authentication device in the embodiment;

FIG. 38 is a schematic view depicting an example of a service level compatible profile list in the embodiment.

DETAILED DESCRIPTION OF THE INVENTION

Now, embodiments of the present invention will be described with reference to the accompanying drawings.

First Embodiment

Figure 1:
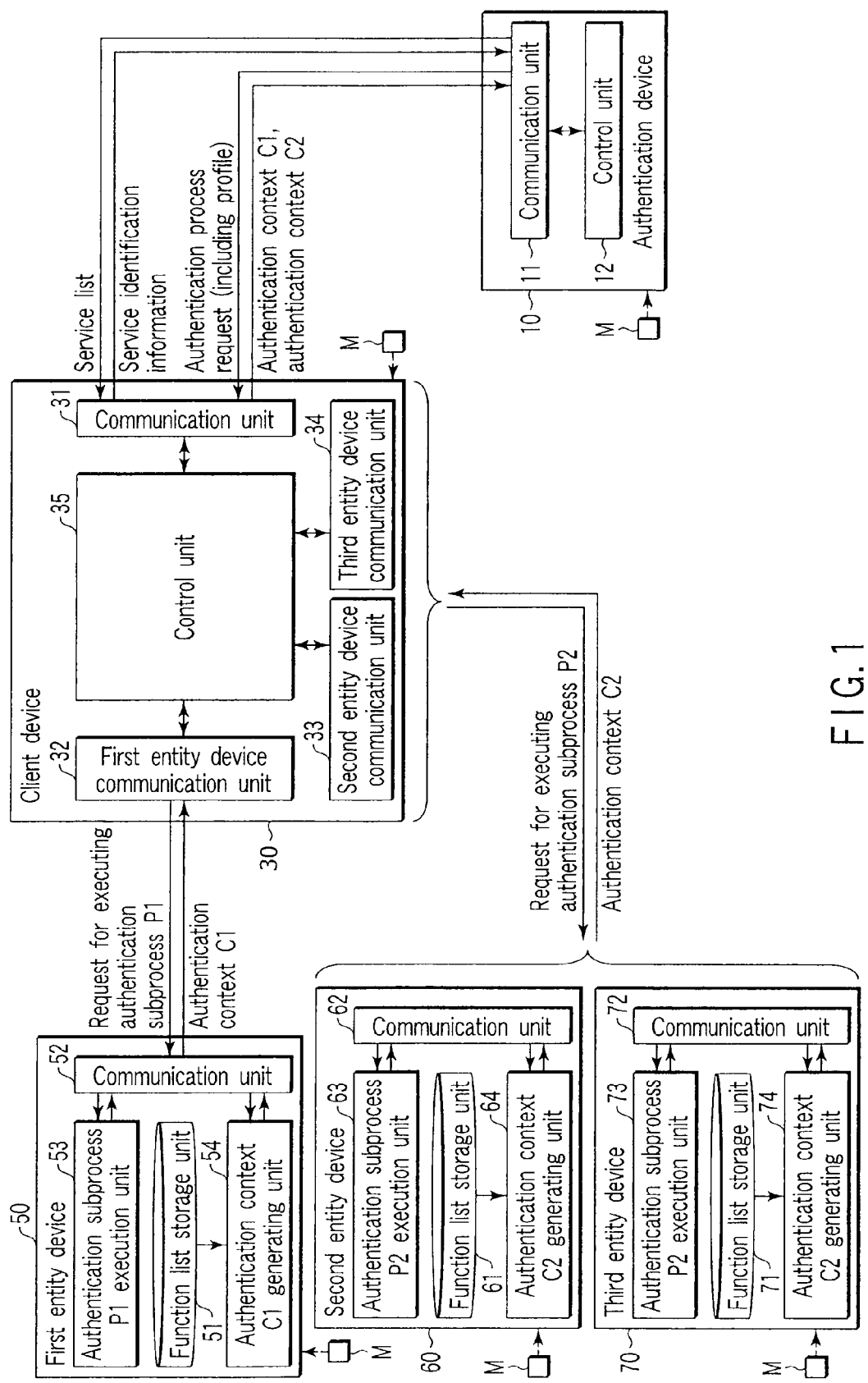
FIG. 1 is a schematic view depicting a configuration of an authentication system according to a first embodiment of the present invention.
Figure 3:
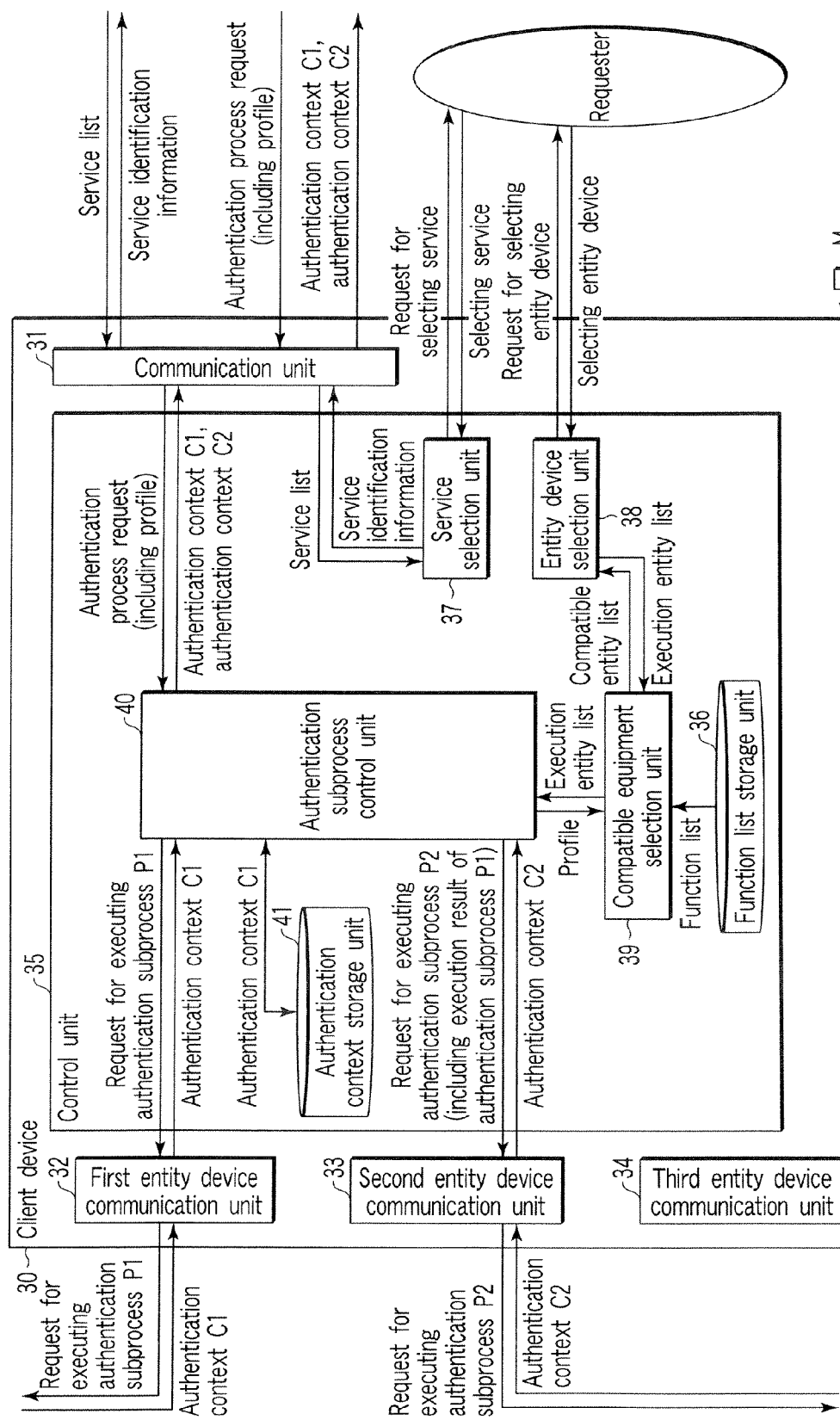
FIG. 3 is a schematic view depicting a configuration of a client device in the embodiment.

FIG. 1 is a schematic view depicting a configuration of an authentication system according to a first embodiment of the present invention; FIG. 2 is a schematic view depicting a configuration of an authentication device in the system; and FIG. 3 is a schematic view depicting a configuration of a client device in the system. The following devices can be implemented on a device by device basis in a hardware configuration or a combination of hardware resources and software components. As software components configured to be combined, there are used programs previously installed in a computer of the corresponding device via a network or from a storage medium M, the programs being adaptive to achieve functions of the corresponding device.

Figure 4:
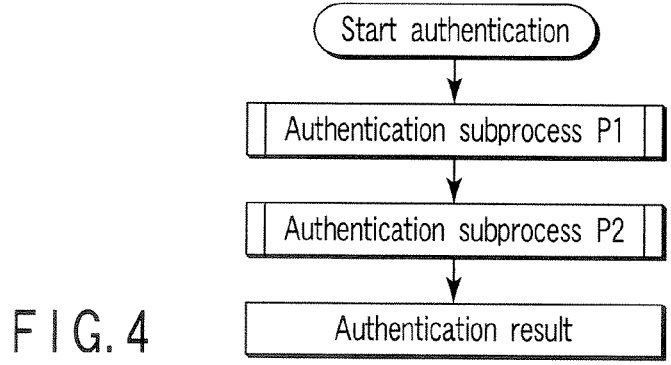
FIG. 4 is a schematic view depicting an example of an authentication process in the embodiment.

A biometric authentication process (hereinafter, referred to as an authentication process), an example of which is shown in FIG. 4, is composed of two processes, i.e., an authentication subprocess P1 and an authentication subprocess P2 that configure a biometric authentication processing. This authentication process shows an example in the case where the authentication subprocess P2 is executed based on a result of the authentication subprocess P1, and then, an authentication result can be obtained as a result of the authentication subprocess P2. The authentication subprocess P1 is executed by means of a first entity device 50, for example, and then, the authentication subprocess P2 is executed by means of either of second or third entity device 60 or 70, for example.

The authentication subprocesses P1 and P2 used here are provided as processes that are constituent elements of the authentication process. Specifically, these subprocesses are provided as those established when the whole authentication process is separated into processes. In other words, in the case where the authentication process is defined as a whole process, the authentication subprocesses P1 and P2 denote partial processes contained in the whole process. For example, in biometric authentication, understandably speaking, the authentication subprocess P1 is provided as a biometric template acquisition process for acquiring biometric template registered in advance; and the authentication subprocess P2 is provided as a matching process for acquiring biometric information from a user, carrying out signal processing, and carrying out matching with the biometric template.

The authentication process may be divided into three or more authentication subprocesses without being limited to these two authentication subprocesses, and they may be executed by means of different entity devices, respectively. In addition, a rear-staged authentication subprocess may be executed with reference to a result of a front-staged authentication subprocess or may be executed without any reference.

An authentication system shown in FIG. 1 comprises: an authentication device 10; a client device 30; a first entity device 50; a second entity device 60; and a third entity device 70.

The authentication device 10 comprises a communication unit 11 and a control unit 12.

The communication unit 11 is intended to execute communication between the client device 30 and the inside of its own device 10. This communication unit has: a function of transmitting a service list acquired from a service providing unit 13 to the client device 30; a function of receiving service identification information from the client device 30; a function of sending out the received service identification information to a service identification information storage unit 14 and a service compatible profile list storage unit 15; a function of sending out a profile acquired from the service compatible profile list storage unit 15 to an authentication process control unit 16; a function of transmitting an authentication process request acquired from the authentication process control unit 16 to the client device 30; a function of receiving authentication contexts C1 and C2 from the client device 30; and a function of sending out the received authentication contexts C1 and C2 to the authentication process control unit 16. Here, the communication unit 11, together with receipt of the authentication contexts C1 and C2, may receive from the client device 30 the profile identification information for identifying a profile used in the client device 30, and then, send out the received authentication contexts C1 and C2, and profile identification information to the authentication process control unit 16.

The control unit 12, as shown in FIG. 2, comprises: a service providing unit 13; a service identification information storage unit 14; a service compatible profile list storage unit 15; an authentication process control unit 16; a profile storage unit 17; and a context verification unit 18.

The service providing unit 13 is intended to execute service providing processing for a requester. This unit stores in advance a service list having listed information relating to all the services that the authentication device 10 can provide, and has a function of sending out the service list to the communication unit 11.

The service identification information storage unit 14 has: a function of storing (memorizing) in a memory device (not shown), service identification information acquired from the communication unit 11; and a function of sending out the stored service identification information to the service providing unit 13. In the present specification, the memory device configures hardware resources, and an arbitrary memory device such as a hard disk, a semiconductor memory and the like can be applied. In addition, the memory devices used by the storage units 14, 15, 17, 20, 23, 24, 36, 41, 44, 51, 61, 71 or the like may be common storage devices for each of the devices 10, 30, 50, 60, and 70 to which the storage units belong or may be independent memory devices.

The service compatible profile list storage unit 15 has: a function of storing (memorizing) in a memory device (not shown), a service compatible profile list in which each item of service identification information indicating each service that the authentication device 10 provides and each item of service compatible profile information (hereinafter, referred to as a profile) have been associated with each other in advance; and a function of sensing out to the communication unit 11 a profile associated with the service identification information acquired from the communication unit 11.

Here, the service compatible profile list, for example, as shown in FIG. 5, lists (compatible) acceptable profiles on a service by service basis, and each profile describes compatible environment information such as: security of a matching device; quality of the matching device; matching algorithms (that the matching device comprises); quality of biometric template; and matching parameters (to be specified at the time of executing the authentication process). In addition, each profile may describe compatible authentication subprocess or procedures for executing such authentication subprocess. In addition, in the service compatible profile list, for example, as shown in FIG. 6, there may exist a plurality of profiles that are (compatible) acceptable on a service by service basis. In this case, the service compatible profile list storage unit 15 sends out to the communication unit 11 all of the profiles associated with the service identification information acquired from the communication unit 11.

The authentication process control unit 16 has: a function of sensing out a profile acquired from the communication unit 11 to the profile storage unit 17; a function of generating an authentication process request including the profile acquired from the communication unit 11 and a message for requesting the client device 30 to execute an authentication process; a function of sending out the generated authentication process request to the communication unit 11; a function of sending out the authentication contexts C1 and C2 acquired from the communication unit 11 to the context verification unit 18; and a function of prompting the service providing unit 13 to start service based on a verification result acquired from the context verification unit 18. Here, it is desirable that the authentication process request should include challenge information such as random numbers from the viewpoint of preventing "reply attack".

The profile storage unit 17 has: a function of storing (memorizing) in a storage device (not shown), a profile acquired from the authentication process control unit 16; and a function of sending out the stored profile to the context verification unit 18.

The context verification unit 18 has: a function of verifying that an authentication process is valid and has been executed in accordance with the profile acquired from the profile storage unit 17, by using the authentication contexts C1 and C2 acquired from the authentication process control unit 16; and a function of sending out a result of the verification to the authentication process control unit 16. In the case where there exist a plurality of the profiles acquired from the profile storage unit 17, the context verification unit 18 executes the verification function described previously for each of the acquired profiles. In the case where verification has been successful in any of the profiles, it may be judged that the verification is successful. In addition, the context verification unit 18 may execute the verification function with respect to only the corresponding profile in the case where profile identification information for identifying the profile used in the client device 30 has been acquired from the authentication process control unit 16.

Figure 7A:
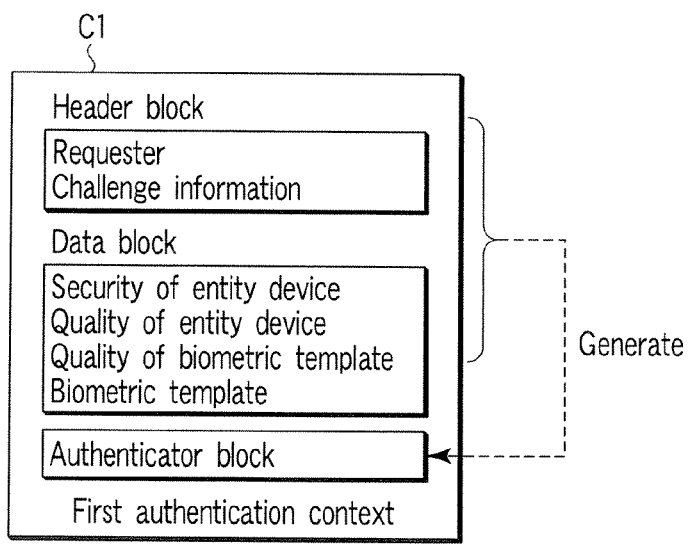
FIGS. 7A and 7B are schematic views each depicting a format of an authentication context in the embodiment.
Figure 7B:
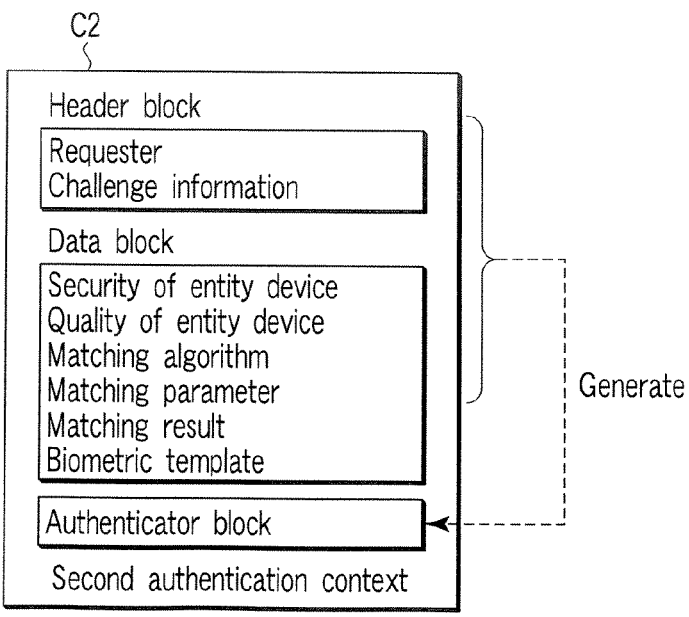

Here, formats of the authentication contexts C1 and C2 each are composed of a header block, a data block, and an authenticator block, as shown in FIGS. 7A and 7B.

The header block, for example, as in a requester, describes information for specifying the authentication contexts or information indicating validity of the authentication contexts like challenge information. The challenge information is provided as variable information to be issued every time an authentication executing request is made, from the viewpoint of preventing a "reply attack", and uses random numbers or the like.

The data block describes entity information. The entity information describes an execution environment or an execution result of an authentication subprocess P1 or P2 as information for guaranteeing that an authentication subprocess has been executed in accordance with a certain profile.

For example, in biometric authentication, the data blocks of the authentication context C1 and the authentication context C2 each describe the security, quality and the like of an entity device having executed the authentication subprocess P1 or P2 as common information. In addition, the authentication context C1 describes the quality of biometric template, biometric template or the like as an execution result of the authentication subprocess P1. The authentication context C2 describes a matching algorithm, a matching parameter, a matching result or the like as an execution result of the authentication subprocess P2. In addition, in order to detect modification of data between the authentication subprocesses, it is desirable that the authentication context C2 should describe an execution result of the authentication subprocess P1 used in the authentication subprocess P2, such as biometric template, for example.

The authenticator block describes an authenticator generated for the header block and the data block. Here, the authenticator denotes, for example, a digital signature or a message authentication code (MAC). The entity devices 50, 60, and 70 hold: a private key in a public key encryption scheme in the case where a digital signature is used as an authenticator; and a secret key shared with the authentication device 10 in advance in the case where MAC is used. The context verification unit 18 verifies an authenticator block, thereby confirming that the authentication context has been generated by means of the entity device having executed the authentication subprocess P1 or P2.

The client device 30 comprises: a communication unit 31; a first entity device communication unit 32; a second entity device communication unit 33; a third entity device communication unit 34; and a control unit 35.

Here, the communication unit 31 is intended to execute communication between the authentication device 10 and one's own device 30. This communication unit has: a function of receiving a service list from the authentication device 10; a function of sending out the received service list to a service selection unit 37; a function of transmitting service identification information acquired from the service selection unit 37 to the authentication device 10; a function of receiving an authentication process request from the authentication device 10; a function of sending out the received authentication process request to an authentication subprocess control unit 40; and a function of transmitting authentication contexts C1 and C2 acquired from the authentication subprocess control unit 40 to the authentication device 10.

The first entity device communication unit 32 is intended to execute communication between the first entity device 50 and one's own device 30. This communication unit has: a function of transmitting an authentication subprocess P1 execution request acquired from the authentication subprocess control unit 40 to the first entity device 50; a function of receiving the authentication context C1 from the first entity device 50; and a function of sending out the received authentication context C1 to the authentication subprocess control unit 40.

The second entity device communication unit 33 is intended to execute communication between the second entity device 60 and one's own device 30. This communication unit has: a function of transmitting an authentication subprocess P2 execution request acquired from the authentication subprocess control unit 40 to the second entity device 60; a function of receiving the authentication context C2 from the second entity device 60; and a function of sending out the received authentication context C2 to the authentication subprocess control unit 40.

The third entity device communication unit 34 is intended to execute communication between the third entity device 70 and one's own device 30. This communication unit has: a function of transmitting the authentication subprocess P2 execution request acquired from the authentication subprocess control unit 40 to the third entity device 70; a function of receiving the authentication context C2 from the third entity device 70; and a function of sending out the received authentication context C2 to the authentication subprocess control unit 40.

The control unit 35, as shown in FIG. 3, comprises a function list storage unit 36; a service selection unit 37; an entity device selection unit 38; a compatible equipment selection unit 39; an authentication subprocess control unit 40; and an authentication context storage unit 41.

Here, the function list storage unit 36 has: a function of storing (memorizing) in a storage device (not shown), function list information (hereinafter, referred to as a function list) contained in all of the entity devices 50, 60 and 70 connected to the client device 30; and a function of sending out all of the stored function lists to the compatible equipment selection unit 39.

Figure 8A:
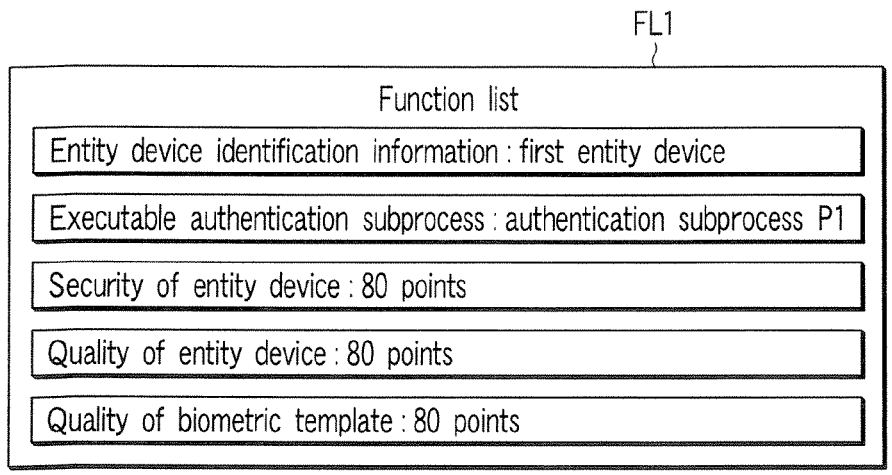
FIGS. 8A to 8C are schematic views each depicting an example of a function list in the embodiment.

Here, the function list describes information relating to an entity device itself and execution environment information relating a function that the entity device comprises. For example, as shown in FIG. 8A, a function list FL1 of the first entity device 50 that executes the authentication subprocess P1 describes: entity device identification information; executable authentication subprocesses; entity device security; entity device quality; biometric template quality or the like.

Figure 8B:
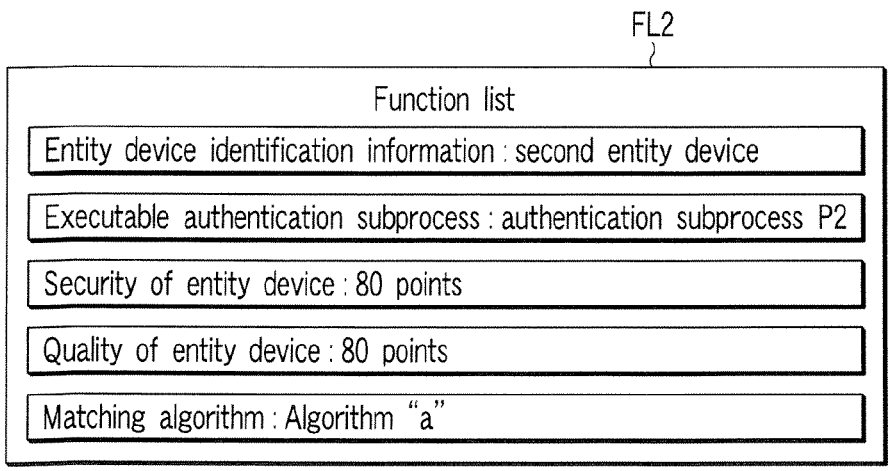
Figure 8C:
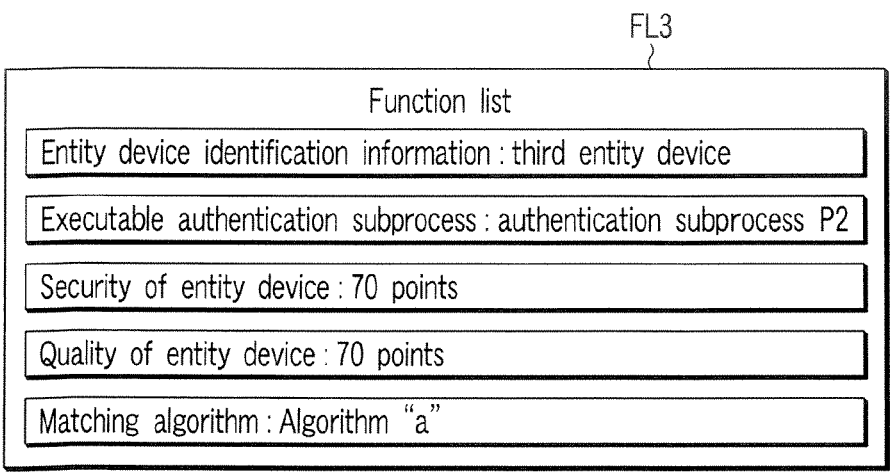

As shown in FIGS. 8B and 8C, function lists FL2 and FL3 of the second and third entity devices 60 and 70 that execute the authentication subprocess P2 describe entity device identification information; executable authentication subprocesses; entity device security; entity device quality; matching algorithms or the like.

Although not shown for the purpose of simplification, it is desirable to acquire function lists of all of the entity devices 50, 60 and 70 connected to the client device 30 from each of the entity devices through each of the entity device communication units 32 to 34 before an authentication process is executed. However, the method for acquiring the function lists is not particularly limited.

The service selection unit 37 has: a function of causing a requester to select one service from a service list acquired from the communication unit 31; and a function of sending out identification information on the requester selected service to the communication unit 31.

For example, the service selection unit 37 causes the requester to select a service by using a Web browser, a dedicated application and the like. The service selection unit 37 is intended to select a service from a service list by interacting with a requester. A method for selecting a service or the like is not limited.

The entity device selection unit 38 has: a function of causing a requester to select entity devices that execute authentication subprocesses on a one by one basis from a compatible entity list received from the compatible equipment selection unit 39; a function of generating an execution entity list from entity devices that execute authentication subprocesses selected by the requester; and a function of sending out the execution entity list to the compatible equipment selection unit 39. For example, the entity device selection unit 38 causes a requester to select entity devices that execute authentication subprocesses by using the Web browser, the dedicated application and the like. The entity device selection unit 38 is intended to select entity devices that execute authentication subprocesses on a one by one basis by interacting with a requester. The selecting method or the like is not limited. In the case where a plurality of profiles are described in the compatible entity list, the entity device selection unit 38 causes a requester to select a profile as well as an entity device.

The compatible equipment selection unit 39 has: a function of selecting all of the entity devices that are adaptive to a profile acquired from the authentication subprocess control unit 40, based on a function list acquired from the function list storage unit 36; a function of generating a compatible entity list having listed all of the selected entity devices for each authentication subprocess; a function of sending out the compatible entity list to the entity device selection unit 38; and a function of sending out to the authentication subprocess control unit 40 an execution entity list which associates each authentication subprocess with an entity device, the execution entity list being acquired from the entity device selection unit 38.

Figure 9:
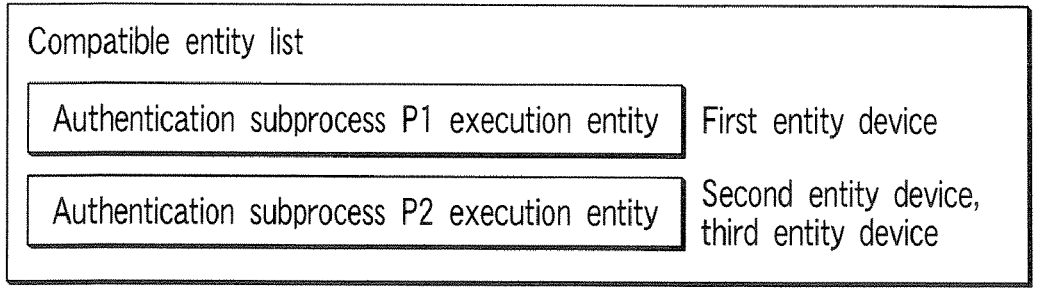
FIG. 9 is a schematic view depicting an example of a compatible entity list in the embodiment.
Figure 11:
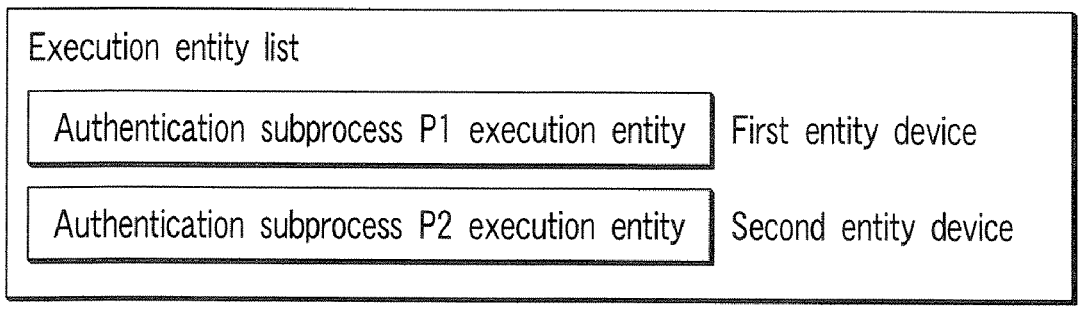
FIG. 11 is a schematic view showing an example of an execution entity list in the embodiment.

Here, as an example, in the case where all of the entity devices that are adaptive to a "profile A" in FIG. 5 are selected based on function lists FL1, FL2, and FL3 shown in FIGS. 8A to 8C, a compatible entity list as shown in FIG. 9 is generated. In addition, FIG. 11 shows an example of an execution entity list generated in the case where the "second entity device 60" has been selected as an authentication subprocess P2 execution entity from the compatible entity list shown in FIG. 9.

Figure 10:
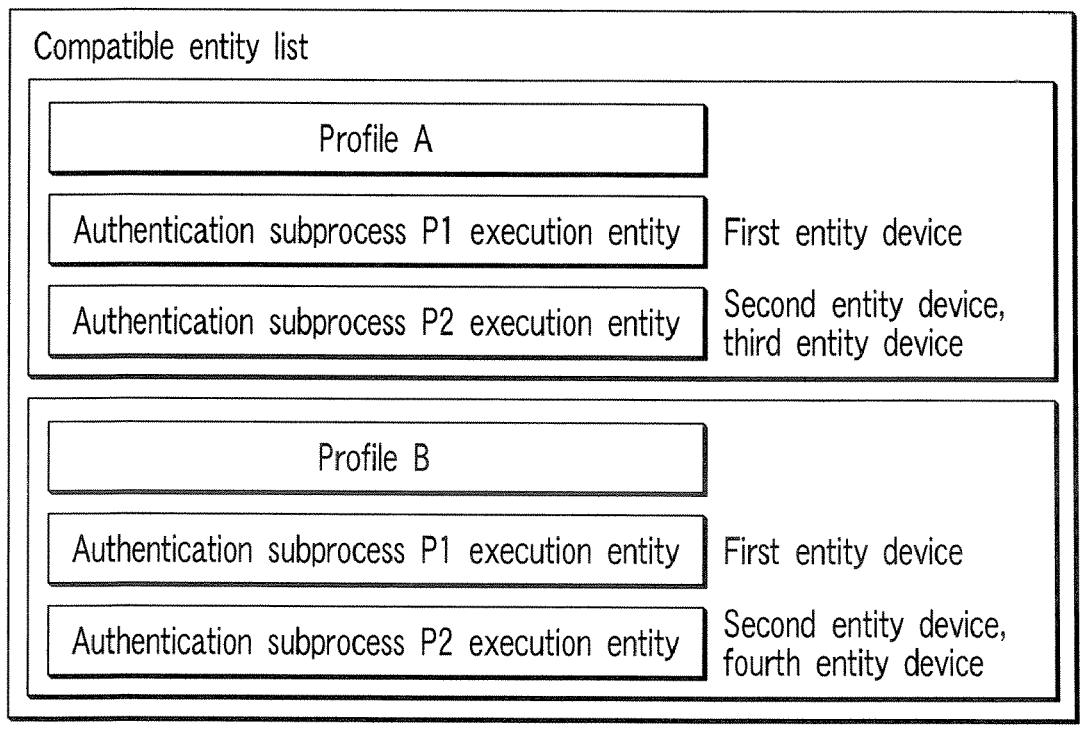
FIG. 10 is a schematic view depicting a modified example of the compatible entity list in the embodiment.
Figure 12:
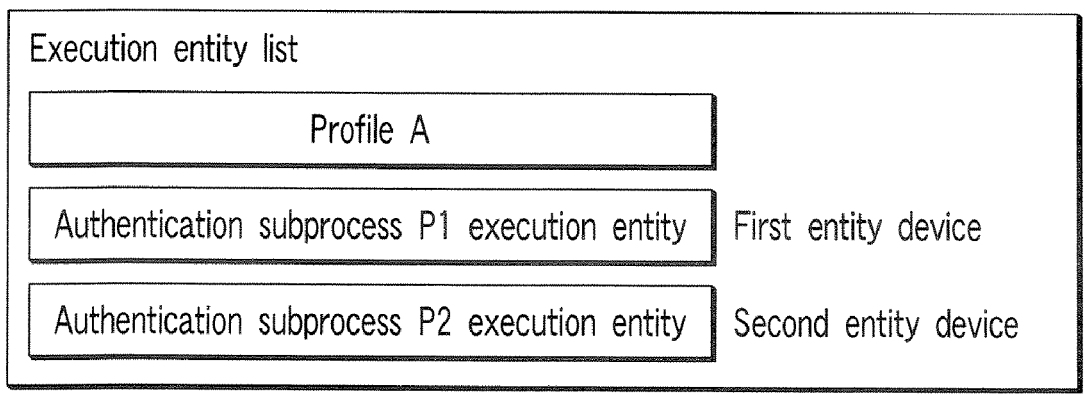
FIG. 12 is a schematic view depicting a modified example of the execution entity list in the embodiment.

In addition, in the case where a plurality of acceptable profiles exist, for example, as shown in FIG. 10, all of the entity devices that are adaptive thereto are described on a profile by profile basis. FIG. 12 shows an example of an execution entity list generated in the case where the profile A and a second entity device serving as the authentication subprocess P2 execution entity have been selected from the compatible entity list shown in FIG. 10.

The authentication subprocess control unit 40 has: a function of sending out to the compatible equipment selection unit 39 a profile included in an authentication process request acquired from the communication unit 31; a function of generating the authentication subprocess P1 execution request based on the profile; a function of sending out the generated authentication subprocess P1 execution request to a communication unit (first entity device communication unit 32 in the case of FIG. 11) with an authentication subprocess P1 execution entity described in the execution entity list received from the compatible equipment selection unit 39; a function of sending out the authentication context C1 acquired from the first entity device 50 to the authentication context storage unit 41; a function of generating an authentication subprocess P2 execution request based on the profile and the authentication context C1 that has been acquired from the first entity device communication unit 32; a function of sending out the generated authentication subprocess P2 execution request to a communication unit (second entity device communication unit 33 in the case of FIG. 11) with the authentication subprocess P2 execution entity device described in the execution entity list received from the compatible equipment selection unit 39; and a function of sending out to the communication unit the authentication context C2 acquired from the communication unit with the entity device having sent out the authentication subprocess P2 execution request and the authentication context C1 acquired from the authentication context storage unit 41. Here, in the case where a plurality of profiles are included in an authentication process request, the authentication subprocess control unit 40 generates each authentication subprocess execution request based on the profile described in the execution entity list. In addition, the authentication subprocess control unit 40 may transmit information for identifying a profile used to execute an authentication process to the authentication device 10 through the communication unit.

The first entity device 50 comprises a function list storage unit 51; a communication unit 52; an authentication subprocess P1 executing unit 53; and an authentication context C1 generating unit 54.

The function list storage unit 51 is intended to store a function list indicating a function of one's own device 50 in advance in a storage device, and then output the function list to the authentication context C1 generating unit 54.

The communication unit 52 is intended to execute communication between the client device 30 and one's own device 50. This communication unit has: a function of receiving an execution request of an authentication subprocess P1 from the client device 30; a function of sending out the received authentication subprocess P1 execution request to the authentication subprocess P1 executing unit 53; a function of sending out the execution result of the authentication subprocess P1 acquired from the authentication subprocess P1 executing unit 53 to the authentication context C1 generating unit 54; and a function of transmitting the authentication context C1 acquired from the authentication context C1 generating unit 54 to the client device 30.

The authentication subprocess P1 executing unit 53 is intended to execute the authentication subprocess P1 described previously based on the execution request of the authentication subprocess P1 acquired from the communication unit 52, and then, output the execution result to the communication unit 52.

The authentication context C1 generating unit 54 is intended to generate the authentication context C1 based on the execution result of the authentication subprocess P1 acquired from the communication unit 52 and a function list acquired from the function list storage unit 51, and then, output the generated authentication context C1 to the communication unit 52.

The second and third entity devices 60 and 70 each have an identical configuration except the contents of a profile such as security, quality and the like. Here, these entity devices will be described altogether. Elements 61 to 64 whose reference numerals are 60s belong to the second entity device 60, and elements 71 to 74 whose reference numerals are 70s belong to the third entity device 70.

The second and third entity devices 60 and 70 comprise function list storage units 61 and 71; communication units 62 and 72; authentication subprocess P2 executing units 63 and 73; and authentication context C2 generating units 64 and 74, respectively.

The function list storage units 61 and 71 are intended to store function lists indicating functions of one's own devices 60 and 70 in advance in a storage device, and then, output the function lists to the authentication context C2 generating units 64 and 74.

The communication units 62 and 72 are intended to execute communication between the client device 30 and each of one's own devices 60 and 70. These communication units each have: a function of receiving an authentication subprocess P2 execution request from the client device 30; a function of sending out the received authentication subprocess P2 execution request to the authentication subprocess P2 executing units 63 and 73; a function of sending out the execution result of the authentication subprocess P2 acquired from each of the authentication subprocess P2 executing units 63 and 73 to the authentication context C2 generating units 64 and 74; and a function of transmitting an authentication context C2 acquired from each of the authentication context C2 generating units 64 and 74 to the client device 30.

The authentication subprocess P2 executing units 63 and 73 are intended to execute the authentication subprocess P2 described previously based on the execution request of the authentication subprocess P2 acquired from the communication units 62 and 72, and then, output the execution result to the communication units 62 and 72.

The authentication context C2 generating units 64 and 74 each are intended to generate the authentication context C2 based on an execution result of the authentication subprocess P2 acquired from the communication units 62 and 72 and the function list acquired from each of the function list storage units 61 and 71, and then, output the generated authentication context C2 to the communication units 62 and 72.

Figure 13:
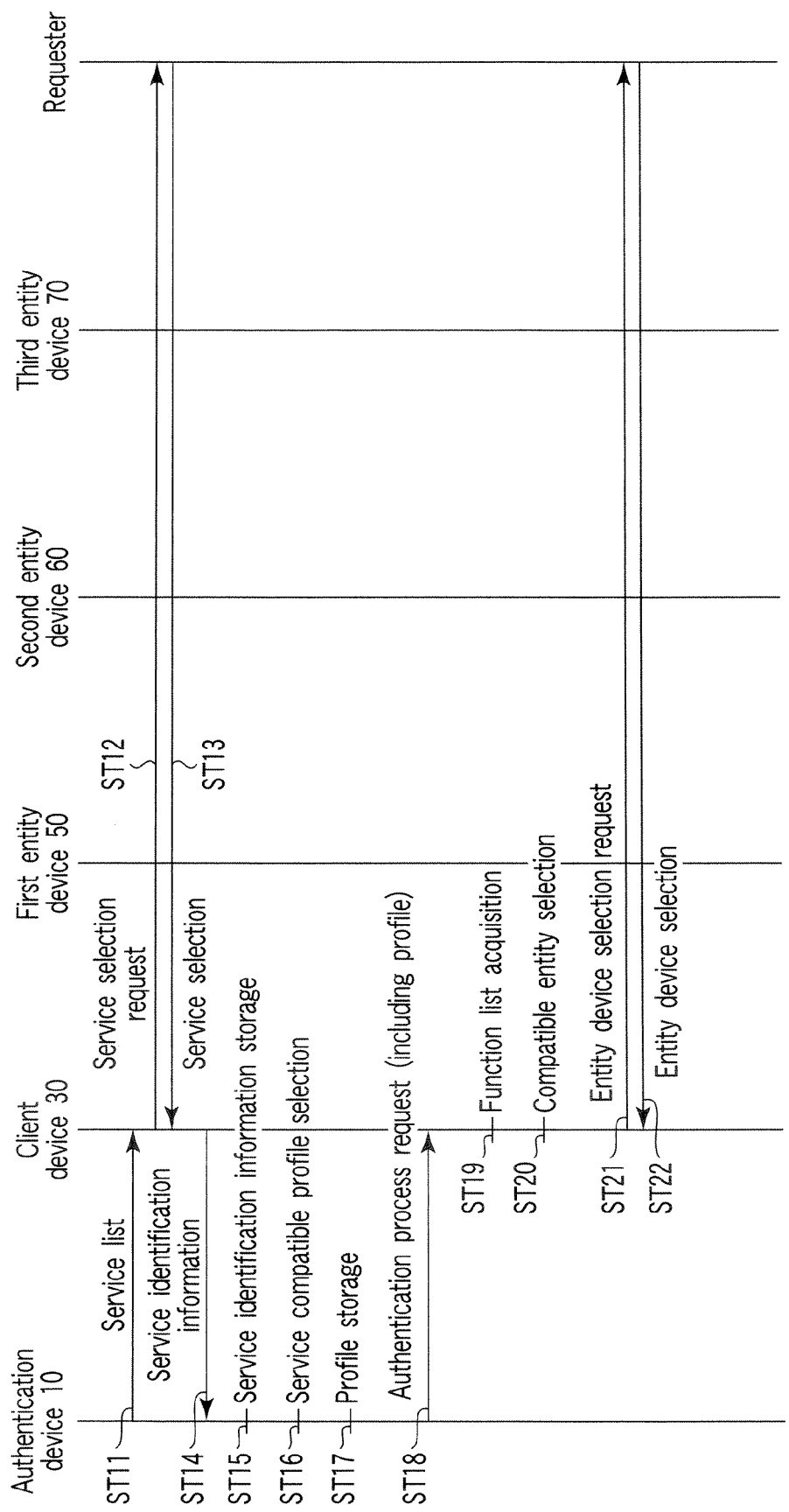
FIG. 13 is a sequence chart for explaining an operation in the embodiment.

Now, an operation of the authentication system configured as above will be described with reference to sequence charts shown in FIGS. 13 and 14.

In the authentication device 10, the service providing unit 13 transmits a service list to a client device 30 through the communication unit 11 (ST11).

In the client device 30, the service selection unit 37 receives a service list through the communication unit 31, and then, displays a service selection request message on a display unit (not shown), so as to cause a user to select one service from the service list (ST12).

When one service is selected by a user operation (ST13), the service selection unit 37 transmits service identification information indicating this service to the authentication device 10 via the communication unit 31 (ST14).

In the authentication device 10, the service identification information storage unit 14 receives service identification information through the communication unit 11, and then, stores the service identification information (ST15). On the other hand, the service compatible profile list storage unit 15 having received the service identification information through the communication unit 11 selects a profile adaptive to the service that the service identification information indicates, and then, sends out the selected profile to the communication unit 11 (ST16).

The authentication process control unit 16 sends out a profile acquired from the communication unit 11 to the profile storage unit 17, and then, stores the profile (ST17). Next, the authentication process control unit 16 generates an authentication process request that includes challenge information such as random numbers, and then, transmits this authentication process request to the client device 30 through the communication unit 11 (ST18).

In the client device 30, the authentication subprocess control unit 40 receives an authentication process request through the communication unit 31, and then, sends out a profile included in the received authentication process request to the compatible equipment selection unit 39.

The compatible equipment selection unit 39 refers to this profile and a function list acquired from a function list storage unit 36 (ST19), and then, selects all of the entity devices that are adaptive to this profile (ST20). The compatible equipment selection unit 39 generates a compatible entity list that indicates a selection result, and then, sends out the compatible entity list to the entity device selection unit 38.

The entity device selection unit 38 displays an entity device selection request message on a display unit (not shown), so as to cause a requester to select entity devices on a one by one basis in response to each authentication subprocess from the compatible entity list (ST21). In this manner, the entity device selection unit 38 prompts the requester to select the entity device. Here, in the case where a plurality of profiles exist, the entity device selection unit 38 prompts the requester to select the profiles as well as selection of the entity devices.

When entity devices are selected by a user operation (ST22), the entity device selection unit 38 generates an execution entity list indicating this selection result, and then, sends out the execution entity list to the authentication subprocess control unit 40 via the compatible equipment selection unit 39.

The authentication subprocess control unit 40 analyzes this execution entity list, and then, confirms an entity device that executes an authentication subprocess. Hereinafter, as an example, an description will be given with respect to a case in which an authentication subprocess has been executed in accordance with the execution entity list shown in FIG. 11. That is, it is assumed that the first entity device 50 is selected as an entity device that executes an authentication subprocess P1 and that the second entity device 60 is selected as an entity device that executes an authentication subprocess P2.

The authentication subprocess control unit 40 transmits an execution request of the authentication subprocess P1 to the first entity device 50 through the first entity device communication unit 32 (ST23). Here, the execution request of the authentication subprocess P1 includes challenge information such as random numbers included in the authentication process request received from the authentication device 10. In addition, in the case where a parameter for executing the authentication subprocess P1 is required, that parameter is included in the execution request of the authentication subprocess P1.

In the first entity device 50, the authentication subprocess P1 executing unit 53 receives the execution request of the authentication subprocess P1 through the communication unit 52, executes the authentication subprocess P1 (ST24), and sends out an execution result to the authentication context C1 generating unit 54 through the communication unit 52. The authentication context C1 generating unit 54 generates an authentication context C1 based on the challenge information included in the execution request of the authentication subprocess P1; the acquired execution result of the authentication subprocess P1 and a function list FL1 acquired from the function list storage unit 51 (ST25); and transmits the authentication context C1 to the client device 30 through the communication unit 52 (ST26).

Here, when biometric authentication is taken as an example, the execution result of the authentication subprocess P1 is obtained as biometric template stored in advance in the first entity device 50.

In the client device 30, the authentication subprocess control unit 40 receives the authentication context C1 through the first entity device communication unit 32, and then, stores the received authentication context C1 in the authentication context storage unit 41 (ST27).

The authentication subprocess control unit 40 generates an execution request of an authentication subprocess P2 that includes the challenge information included in an authentication process request received from the authentication device 10 and the execution result of the authentication subprocess P1 described in the authentication context C1; and transmits the execution request of this authentication subprocess P2 to the second entity device 60 through the second entity device communication unit 33 (ST28). In addition, if a parameter for executing the authentication subprocess P2 is required, that parameter is included in the execution request of the authentication subprocess P2. In the authentication subprocess P2, in the case where it is necessary to verify validity of the authentication subprocess P1, the authentication context C1 is transmitted to the second entity device 60.

In the second entity device 60, the authentication subprocess P2 executing unit 63 executes the authentication subprocess P2 based on the execution request of the authentication subprocess P2 received through the communication unit 62 and the execution result of the authentication subprocess P1 included in the execution request of the authentication subprocess P2 (ST29), and then, sends out the execution result to the authentication context generating unit 64 through the communication unit 62.

Here, when biometric authentication is taken as an example, the authentication subprocess P2 is provided as a process for matching biometric template acquired from the first entity device 50 and biometric sample information generated by applying signal processing to the biometric information acquired from a user with each other, and then, determining whether the user is valid or not in accordance with a matching result.

The authentication context C2 generating unit 64 generates an authentication context C2 based on the challenge information included in the execution request of the authentication subprocess P2; the acquired execution result of the authentication subprocess P2; and a function list FL2 acquired from the function list storage unit 61 (ST30), and then, transmits the authentication context C2 to the client device 30 through the communication unit 62 (ST31).

In the client device 30, the authentication subprocess control unit 40 receives the authentication context C2 through the second entity device communication unit 33 (ST32), and then, transmits the received authentication context C2 to the authentication device 10 through the communication unit 31 together with the authentication context C1 stored in the authentication context storage unit 41 (ST33).

In the authentication device 10, the authentication process control unit 16 receives authentication contexts C1 and C2 through the communication unit 11, and then, sends out the authentication contexts C1 and C2 to the context verification unit 18.

The context verification unit 18 verifies the authentication contexts C1 and C2 in accordance with a profile acquired from the profile storage unit 17 (ST34), and then, transmits a verification result to the authentication process control unit 16.

When this verification result indicates a principal verification, the authentication process control unit 16 prompts the service providing unit 13 to start service. The service providing unit 13 executes a service providing process for a requester by this prompt (ST35).

As described above, according to the present embodiment, with a configuration in which the client device 30 prompts a requester to select the entity devices 50 and 60 that execute authentication subprocesses, even in the case where there exist a plurality of entity devices each comprising the same function adaptive to one profile in a requester's execution environment, it becomes possible to determine an entity device for use in authentication process.

Therefore, at the time of providing service in an open network environment, an arbitrary user can be biometrically authenticated by means of an arbitrary entity device, and convenience and adaptability can be improved.

In addition, for the requester, it is considered possible to select an entity device desired by oneself according to a situation and it is considered possible to carry out smooth authentication based on the requester's judgment.

For example, in the case where the requester's biometric environment comprises: an entity device available from a company A having a fingerprint matching function and an entity device available from a company B having a face matching function and both of the entity devices are adaptive to a profile requested by a verifier, for example, if face authentication is carried out in dark place, there is a high possibility that such authentication fails. However, it is considered difficult for an entity device or the client device 30 to have a function of judging their environment situations. However, according to the present invention, the requester flexibly judges such a "dark" situation, and then, selects a fingerprint device, thereby making it possible to execute more reliable authentication.

Second Embodiment

Figure 17:
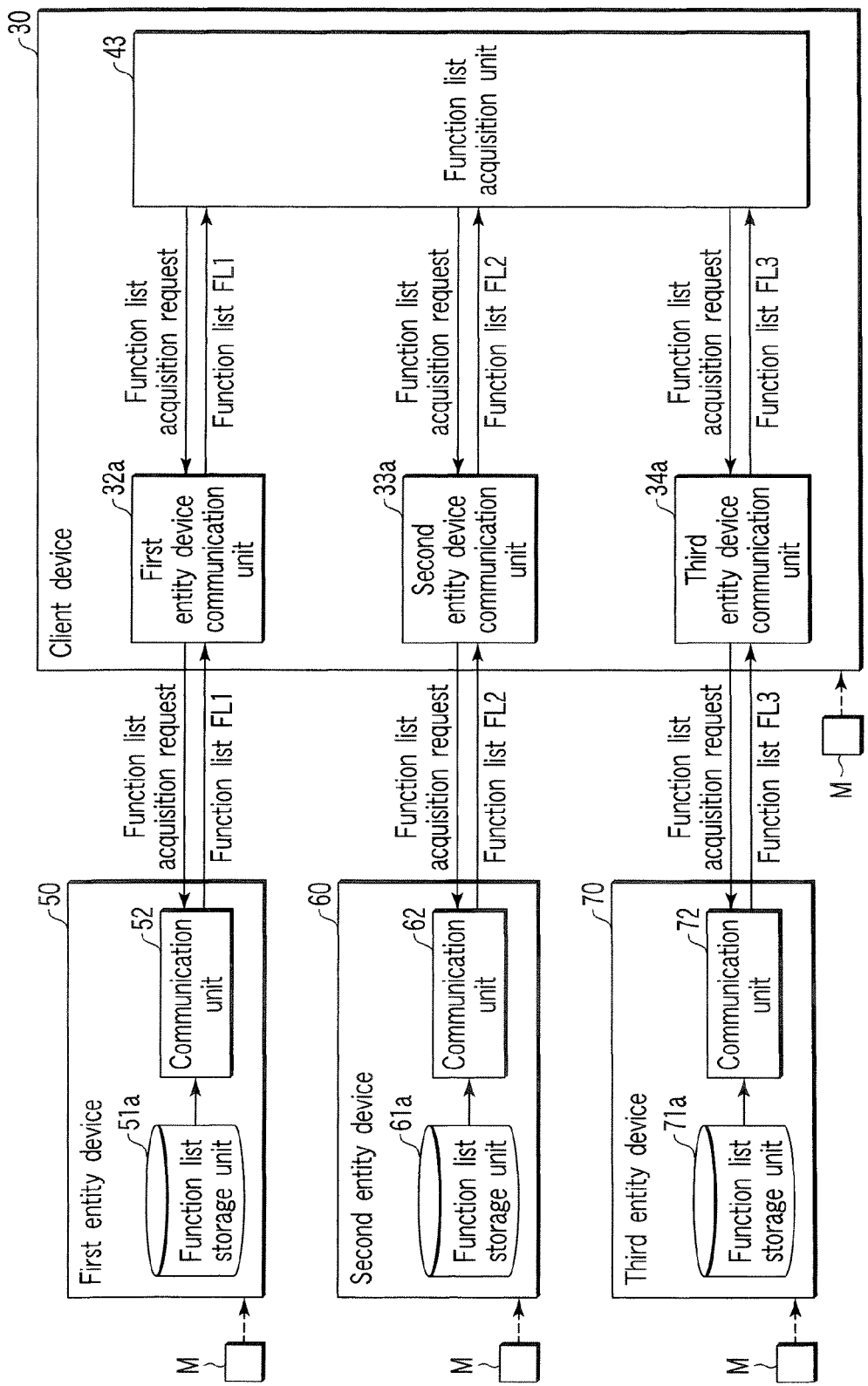
FIG. 17 is a schematic view for explaining added portions in the embodiment.

FIG. 15 is a schematic view depicting a configuration of an authentication system according to a second embodiment of the present invention. Like constituent elements in the figures described previously are designated by like reference numerals, and substantially adding constituent elements are designated by like alphabetic subscripts. A duplicate functional description is omitted here. Now, only different constituent elements will be primarily described here. In the following embodiments as well, a duplicate description is omitted therefrom. FIG. 16 is a schematic view depicting a configuration of a client device in the same system. FIG. 17 is a schematic view for explaining added portions in the first embodiment in particular.

The present embodiment is provided as a modified example of the first embodiment. With a configuration in which an entity device connection verification unit 42 and a function list acquisition unit 43 have been added to a client device 30, each of entity devices 50, 60, and 70 are dynamically connectable (removable). Concurrently, a compatible equipment selection unit 39a, in addition to the function of the compatible equipment selection unit 39 described previously, has: a function of sending out an entity device connection verification request to the entity device connection verification unit 42; and a function of sending out a function list acquisition request to the function list acquisition unit 43 in order to acquire a function list of an entity device newly connected to the client device 30.

Here, the entity device connection verification unit 42 prompts a requester to connect an entity device for use in authentication process to the client device 30 in response to a request from the compatible equipment selection unit 39a.

The function list acquisition unit 43 has a function of sending out a function list acquisition request through entity device communication units 32a to 34a to an entity device newly connected to the client device 30; and a function of sending out the acquired function list to a function list storage unit 36a.

The entity device communication units 32a to 34a each, in addition to the functions described previously, have: a function of transmitting a function list acquisition request acquired from the function list acquisition unit 43, to the entity devices 50 to 70 each; a function of receiving a function list from each of the entity devices 50 to 70; and a function of sending out the received function list to the function list acquisition unit 43.

In the entity devices 50 to 70, communication units 52, 62, and 72, in addition to the functions described previously, have: a function of receiving a function list acquisition request from the client device 30; and a function of transmitting the function lists acquired from the function list storage units 51, 61, and 71 to the client device 30.

The function list storage units 51, 61, and 71, in addition to the functions described previously, have a function of sending out a function list to the communication units 52, 62, and 72.

Figure 18:
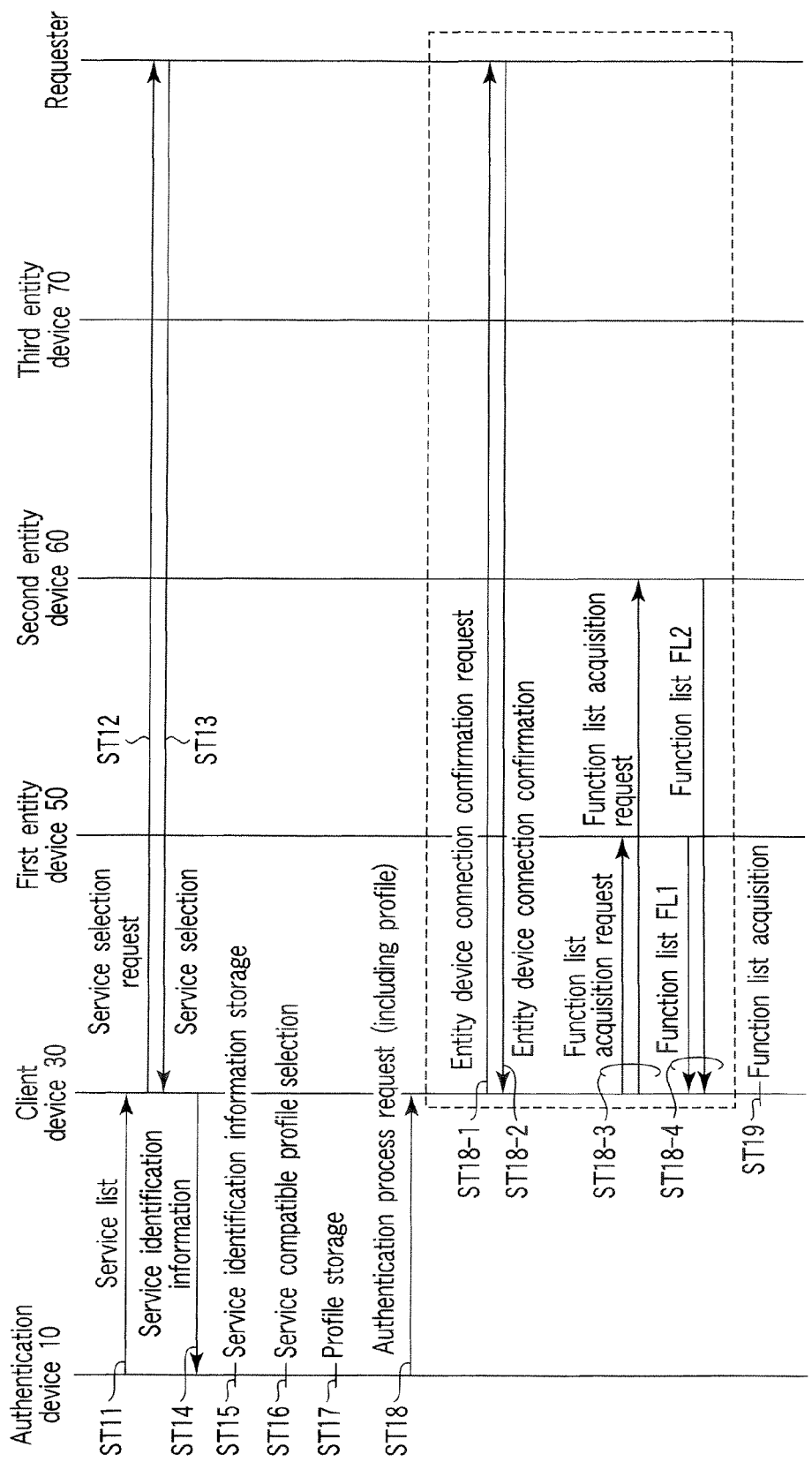
FIG. 18 is a sequence chart for explaining an operation in the embodiment.

Now, an operation of the authentication system configured as above will be described with reference to a sequence chart shown in FIG. 18.

Here, an operation of an authentication device 10 transmitting an authentication process request to the client device 30 (ST1 to ST18) is identical to that according to the first embodiment. A duplicate description is omitted here.

In the client device 30, an authentication subprocess control unit 40 receives an authentication process request through a communication unit 31, and then, sends out a profile included in the received authentication process request to the compatible equipment selection unit 39a.

The compatible equipment selection unit 39a sends out an entity device connection verification request to the entity device connection verification unit 42.

The entity device connection verification unit 42 having acquired an entity device connection verification request displays an entity device connection verification request message on a display unit (not shown), so as to prompt a requester to verify whether or not to newly connect an entity device for use in authentication process to the client device 30 (ST18-1). Here, it is assumed that the first and second entity devices 50 and 60 have been newly connected to the client device 30.

When an entity device connection verification message indicating that connection between the entity devices 50 and 60 has been verified is inputted to the entity device connection verification unit 42 by a requester operation (ST18-2), the entity device connection verification unit 42 sends out the entity device connection verification to the compatible equipment selection unit 39a.

Upon acquiring the entity device connection verification message, the compatible equipment selection unit 39a sends out a function list acquisition request to the function list acquisition unit 43 in order to acquire function lists of the newly connected entity devices 50 and 60.

The function list acquisition unit 43 having received a function list request transmits a function list acquisition request through entity device communication units 32a and 33a to the newly connected entity devices 50 and 60 (ST18-3).

In the entity devices 50 and 60, the function list storage units 51 and 61 receive a function list acquisition request through the communication units 52 and 62, and then, transmits function lists FL1 and FL2 to the client device 30 through the communication units 52 and 62 (ST18-4).

In the client device 30, the function list acquisition unit 43 sends out acquired function lists FL1 and FL2 to the function list storage unit 36a (ST19).

The following processing operations of steps ST20 to ST35 are identical to those according to the first embodiment. A duplicate description is omitted here.

As described above, according to the present embodiment, in addition to advantageous effect of the first embodiment, with a configuration in which the client device 30 prompts verification of whether or not to newly connect an authentication entity device, even in the case where demounting of the entity device occurs, convenience and adaptability can be improved.

Additionally, the client device 30 can confirm with the requester that an entity device caused to execute an authentication subprocess has been connected to the client device 30. In addition, in the case where connection of the entity device has been verified, a function list of the verified entity device can be acquired.

In this manner, in the case where connection of the entity device is explicitly verified for the requester, and then, connection of the new entity device has been verified, it becomes possible to select a profile adaptive to the requester's execution environment including the connected entity devices 50 and 60 in addition to all of the entity devices 70 connected in advance. Therefore, the requester can flexibly make entity device connection and can improve the requester's convenience.

Third Embodiment

Figure 19:
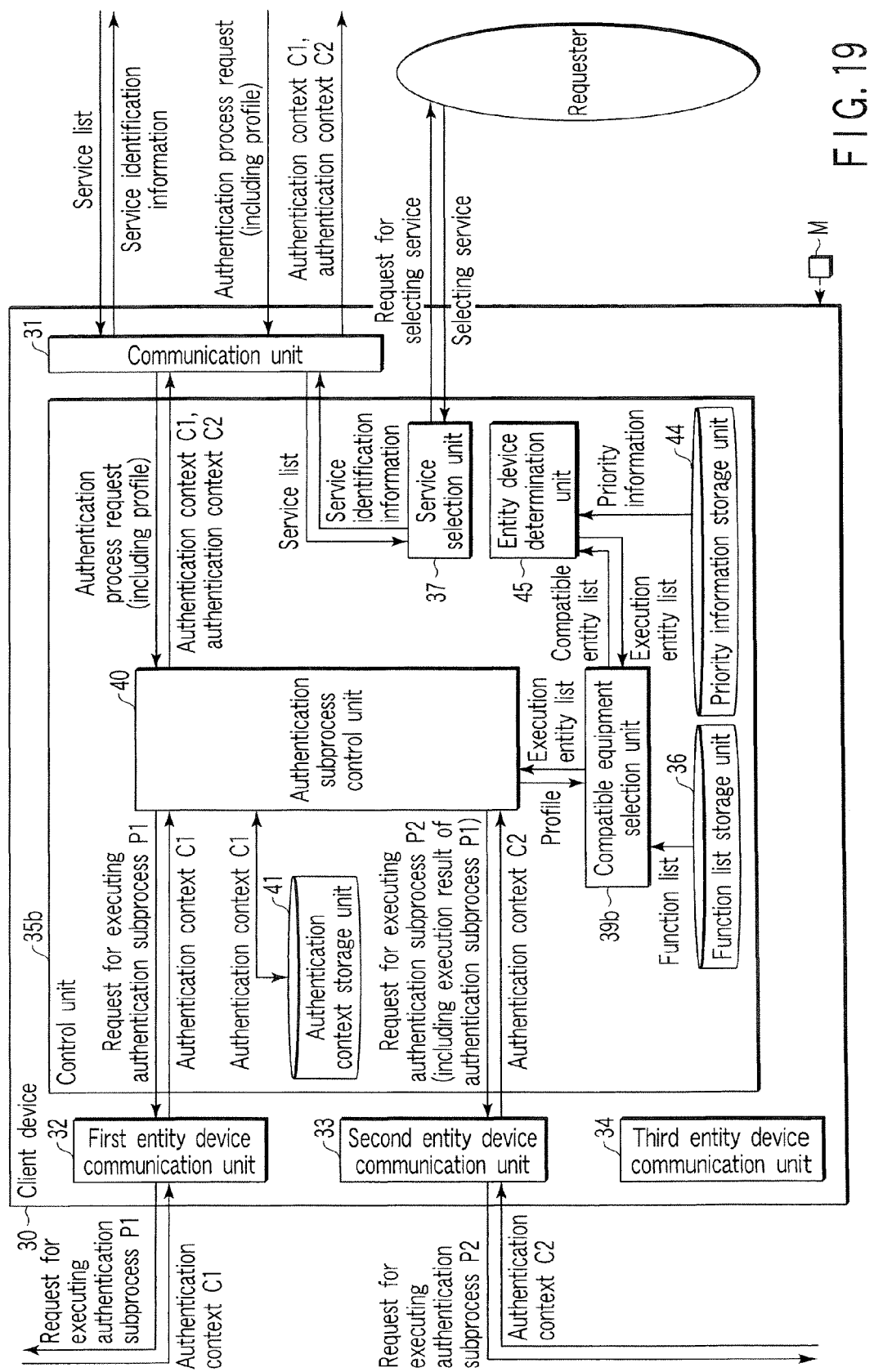
FIG. 19 is a schematic view depicting a configuration of a client device in an authentication system according to a third embodiment of the present invention.

FIG. 19 is a schematic view depicting a configuration of a client device in an authentication system according to a third embodiment of the present invention.

The present embodiment is provided as an example of an authentication system in the case where, a priority is specified in advance for entity devices that execute an authentication subprocess, and there is no need for causing a user to select the entity devices that execute the authentication subprocess every time an authentication process is executed.

A client device 30 comprises each of the units 31 to 35 described previously and a control unit 35b that has been slightly changed.

The control unit 35b comprises a function list storage unit 36; a service selection unit 37; a compatible equipment selection unit 39b; an authentication subprocess control unit 40; an authentication context storage unit 41; a priority information storage unit 44; and an entity device determination unit 45.

The priority information storage unit 44, for example, as shown in FIG. 20, is intended to store (memorize) in a storage device (not shown) information obtained by assigning priorities to entity devices 50, 60, and 70 used for each of the authentication subprocesses P1 and P2 as priority information, and then, output the priority information in response to a request from the entity device determination unit 45. In addition, the priority information storage unit 44, for example, as shown in FIG. 21, may store priority information obtained by assigning priorities to profiles used at the time of executing an authentication process together with entity device priority information, and then, output the priority information in response to a request from the entity device determination unit 45.

The entity device determination unit 45 has: a function of generating an execution entity list from a compatible entity list acquired from the compatible equipment selection unit 39b, based on the priority information acquired from the priority information storage unit 44; and a function of sending out the generated execution entity list to the compatible equipment selection unit 39b.

Figure 22:
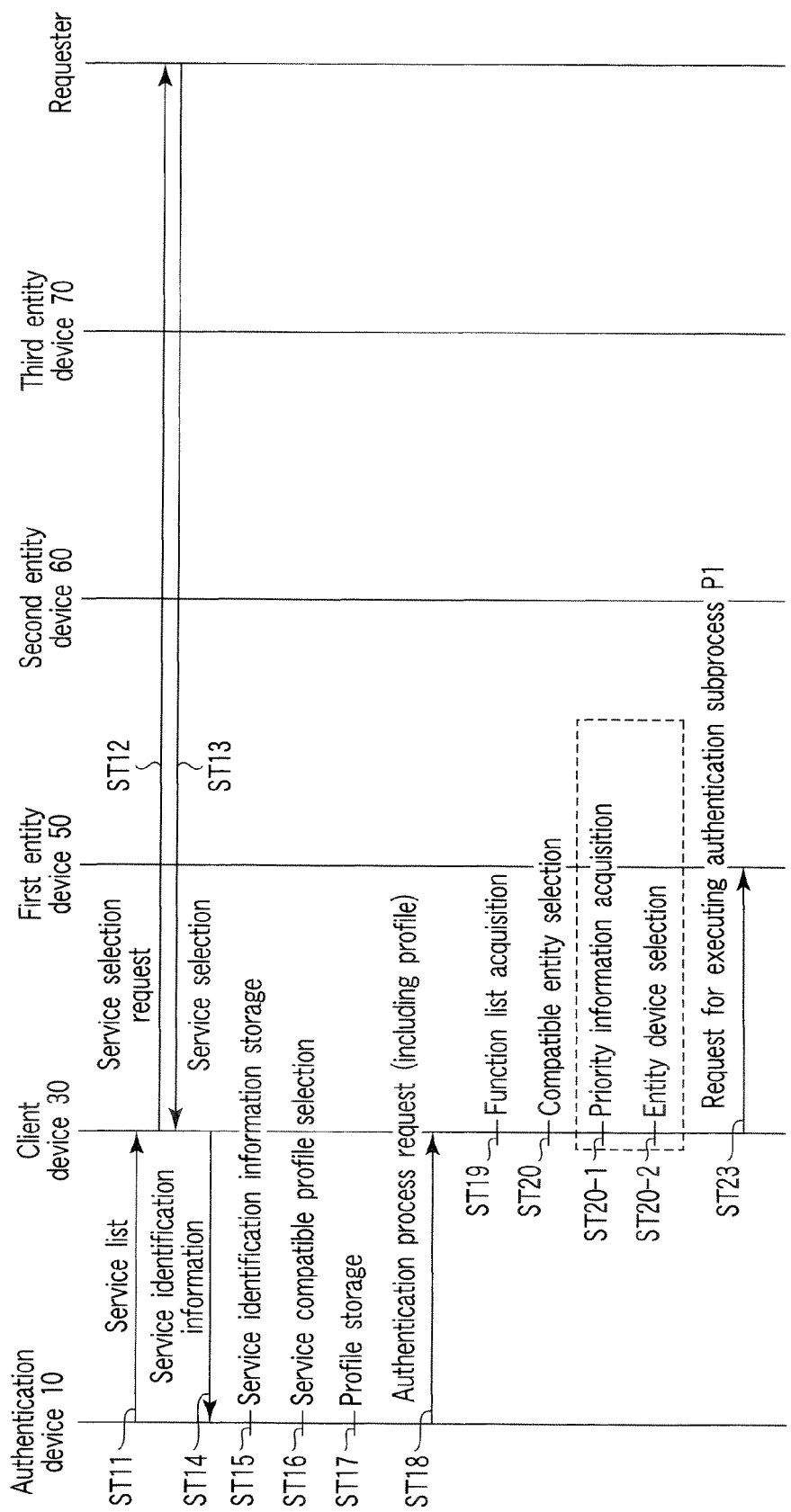
FIG. 22 is a sequence chart for explaining an operation in the embodiment.

Now, an operation of the authentication system configured as above will be described with reference to FIG. 22.

Here, an operation of an authentication device 10 transmitting an authentication process request to a client device 30 (ST11 to ST18) is identical to that according to the first embodiment. A duplicate description is omitted here.

In the client device 30, the authentication subprocess control unit 40 receives an authentication process request through a communication unit 31, and then, sends out a profile included in the received authentication process request to the compatible equipment selection unit 39b.

The compatible equipment selection unit 39b refers to this profile and a function list acquired from the function list storage unit 36 (ST19), and then, selects all of the entity devices 50 to 70 adaptive to the profile (ST20). The compatible equipment selection unit 39b generates a compatible entity list indicating a selection result, and sends out the compatible entity list to the entity device determination unit 45. Here, in the case where a plurality of profiles exist, the compatible equipment selection unit 39b may select all of the entity devices that are adaptive on a profile by profile basis or may select a profile based on priority information acquired from the priority information storage unit 44.

The entity device determination unit 45 refers to the priority information acquired from the priority information storage unit 44 (ST20-1), and then, selects entity devices from a compatible entity list (ST20-2). Here, in the case where a plurality of profiles exist, the entity device determination unit 45 selects entity devices together with the profiles. Then, the entity device determination unit 45 generates an execution entity list indicating a selection result, and then, sends out the execution entity list to the authentication process control unit 40 via the compatible equipment selection unit 39b.

The authentication subprocess control unit 40, as described previously, analyzes this execution entity list, and then, confirms entity devices that execute an authentication subprocess. Hereinafter, the processing operations in steps ST23 to ST35 are identical to those according to the first embodiment. A duplicate description is omitted here.

As has been described above, according to the present embodiment, a requester can set a priority to entity devices that execute an authentication subprocess in advance and can select used entity devices in a semi-automatic manner. Thus, the requester's convenience at the time of executing authentication can be remarkably improved. In addition, even if the requester selects an entity device every time and efficiency is still poor, convenience and adaptability can be improved.

Fourth Embodiment

Figure 23:
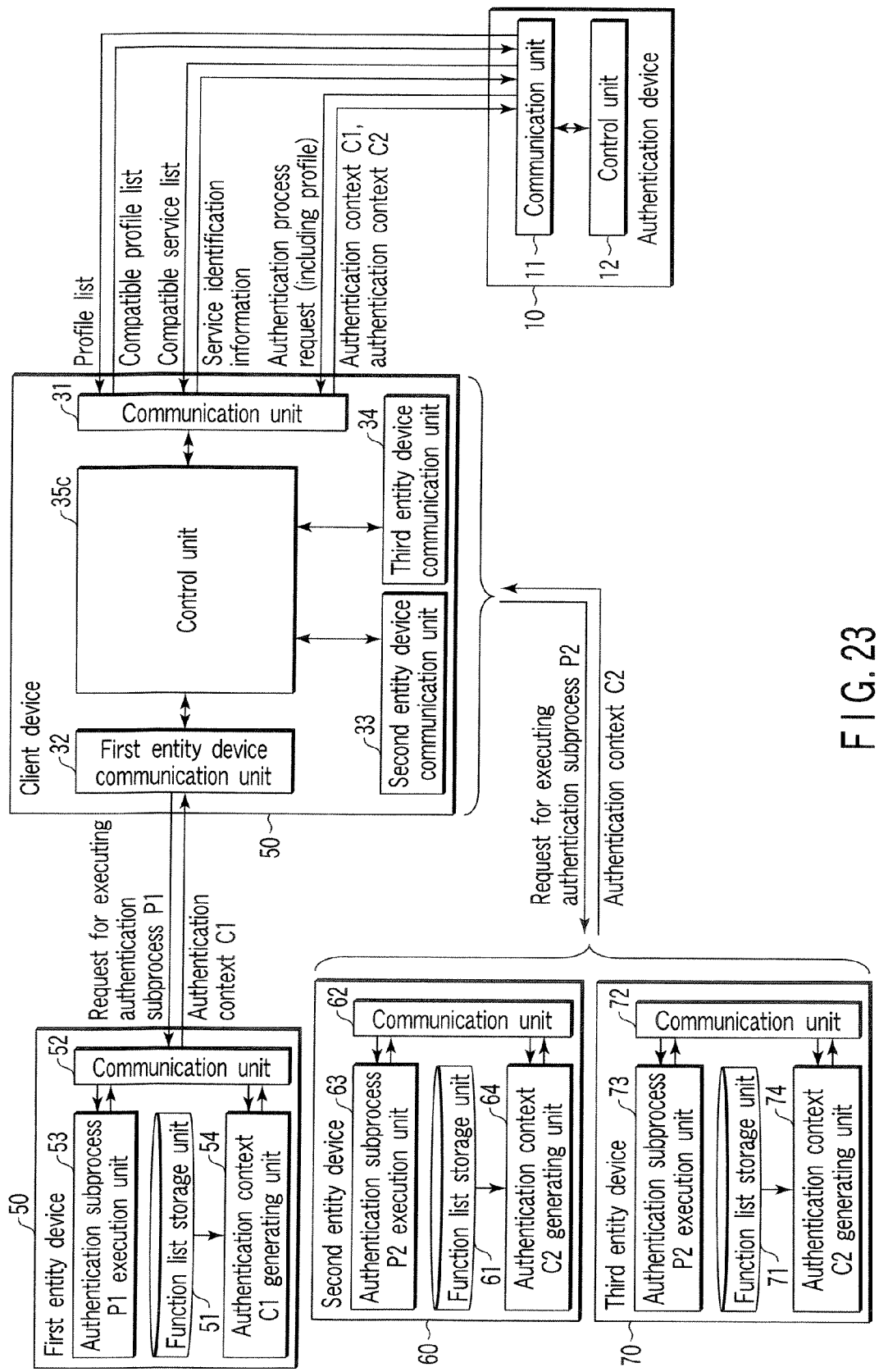
FIG. 23 is a schematic view depicting a configuration of an authentication system according to a fourth embodiment of the present invention.
Figure 25:
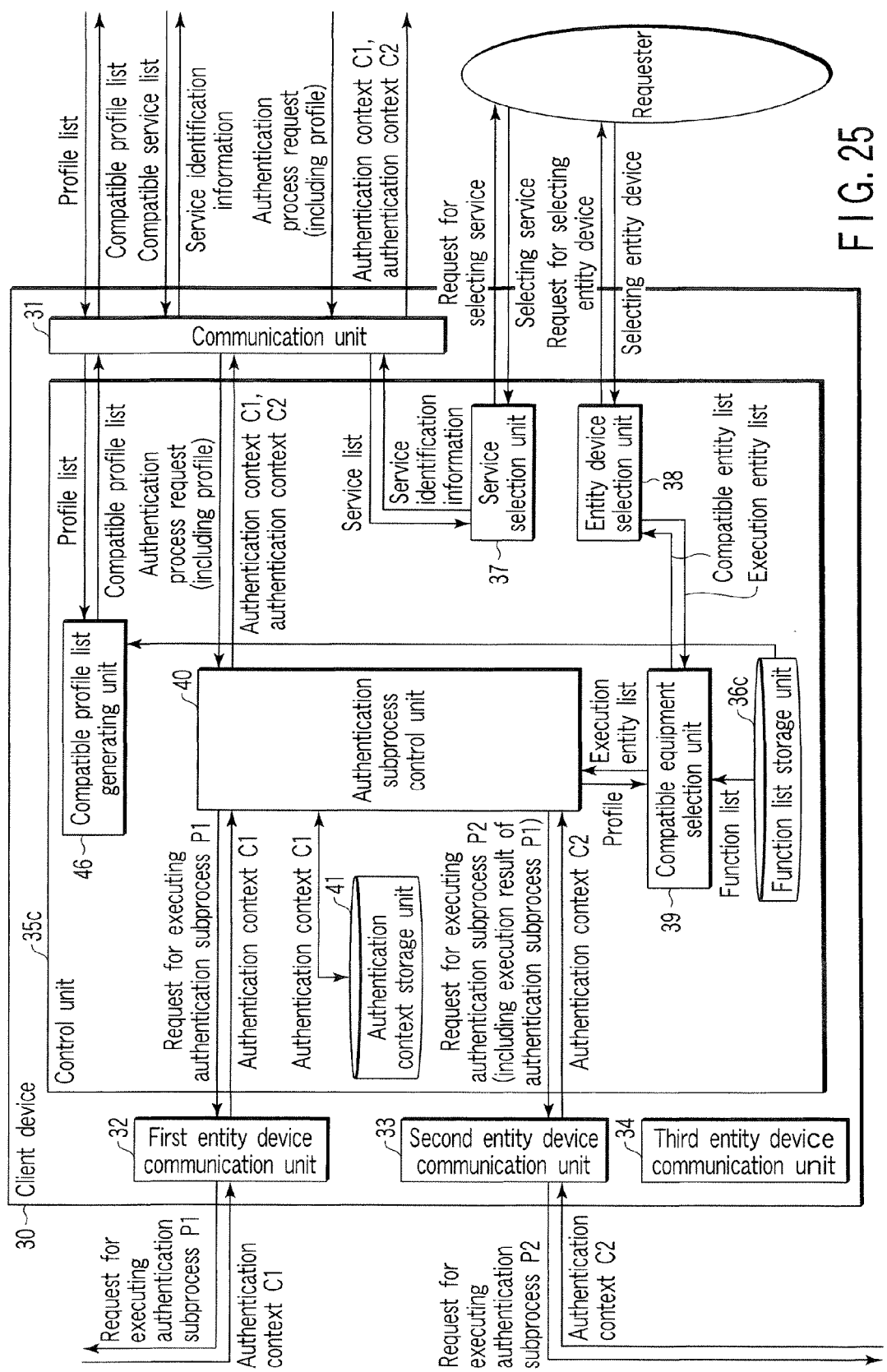
FIG. 25 is a schematic view depicting a configuration of a client device in the embodiment.

FIG. 23 is a schematic view depicting a configuration of an authentication system according to a fourth embodiment of the present invention; FIG. 24 is a schematic view depicting a configuration of an authentication device in the same system; and FIG. 25 is a schematic view depicting a configuration of a client device in the same system.

The present embodiment is provided as a modified example of the first embodiment. The present embodiment shows a mode that causes a requester to select only a service that can be provided to a client's environment with a configuration in which a compatible profile list generating unit 46 is added to a client device 30, and then, a profile compatible service list generating unit 19 is added to an authentication device 10.

In the authentication device 10, a communication unit 11, in addition to the functions described previously, has: a function of transmitting a profile list acquired from a service compatible profile list storage unit 15 to the client device 30; a function of receiving from the client device 30 a compatible profile list listing all of profiles adaptive to an entity device connected to the client device 30; a function of sending out the received compatible profile list to the profile compatible service list generating unit 19; and a function of transmitting a compatible service list acquired from the profile compatible service list generating unit 19 to the client device 30.

The service compatible profile list storage unit 15, in addition to the functions described previously, has: a function of outputting a profile list listing all of profiles described in a service compatible profile list; and a function of outputting the service compatible profile list to the profile compatible service list generating unit 19.

The profile compatible service list generating unit 19 is intended to select all services having profiles matching a compatible profile list acquired from the communication unit 11 from among the services described in the service compatible profile list acquired from the service compatible profile list storage unit 15, and then, generate and output a service list of the selected services based on a service list acquired from a service providing unit 13.

In the client device 30, a communication unit 31, in addition to the functions described previously, has: a function of receiving a profile list from the authentication device 10; a function of sending out the received profile list to the compatible profile list generating unit 46; and a function of transmitting the compatible profile list acquired from the compatible profile list generating unit 46 to the authentication device 10.

The compatible profile list generating unit 46 has: a function of generating a compatible profile list listing all profiles that can be executed in a client's environment, from the profile lists acquired from the communication unit 31 based on the function list acquired from the function list storage unit 36; and a function of sending the generated compatible profile list to the communication unit 31.

Here, as an example, FIG. 27 shows a compatible profile list generated from a profile list shown in FIG. 26 based on function lists shown in FIGS. 8A to 8C.

Figure 28:
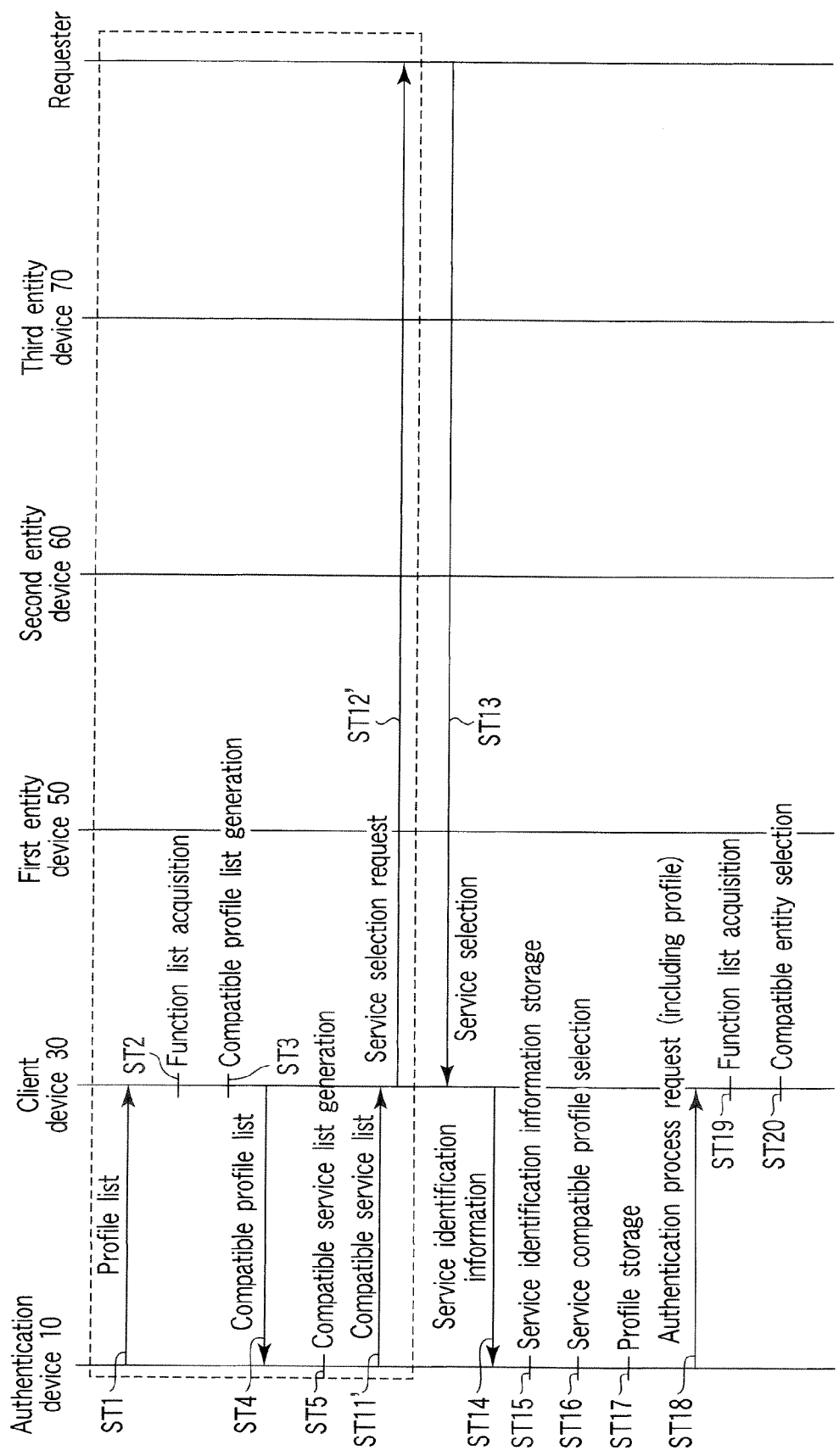
FIG. 28 is a sequence chart for explaining an operation in the embodiment.

Now, an operation of the authentication system configured as above will be described with reference to a sequence chart shown in FIG. 28.

In the authentication device 10, a service compatible profile list storage unit 15 transmits a profile list to the client device 30 through the communication unit 11 (ST1).

In the client device 30, the compatible profile list generating unit 46 refers to a function list acquired from the function list storage unit 36 (ST2); generates a compatible profile list from the profile list acquired from the authentication device 10 through the communication unit 31 (ST3); and transmits the generated list to the authentication device 10 through the communication unit 31 (ST4).

In the authentication device 10, the profile compatible service list generating unit 19 selects all services having profiles matching the compatible profile list acquired from the client device 30 through the communication unit 11, from among the services described in the service compatible profile list acquired from the service compatible profile list storage unit 15.

Then, the profile compatible service list generating unit 19 generates a service list of the selected services based on a service list acquired from the service providing unit 13, and then, transmits the generated service list to the client device 30 through the communication unit 11 (ST5). This service list is provided as a service list compatible with a profile acquired from the client device 30, and thus, is represented as a "compatible service list" in FIG. 28.

In the authentication device 10, the service providing unit 13 transmits a compatible service list to the client device 30 through the communication unit 11 (ST11').

In the client device 30, a service selection unit 37 receives a compatible service list through the communication unit 31, and then, displays a service selection request message on a display unit (not shown), so as to cause a user to select one service from the compatible service list (ST12').

The processing operations from steps S13 to ST35 below are identical to those according to the first embodiment. A duplicate description is omitted here.

As has been described above, according to the present embodiment, in addition to the advantageous effect of the first embodiment, with a configuration in which the authentication device 10 transmits all of the profile information to the client device 30; receives profile information compatible with an execution environment from the client device 30; and then, transmits the corresponding profile information based on the thus received profile information to the client device 30, a verifier can provide only a requester's applicable service and the requester can select only the applicable service.

Therefore, in the case where there exist a plurality of services which the verifier provides to the requester, and then, profiles different depending on services are associated with each other as well, convenience and adaptability can be improved.

Fifth Embodiment

Figure 30:
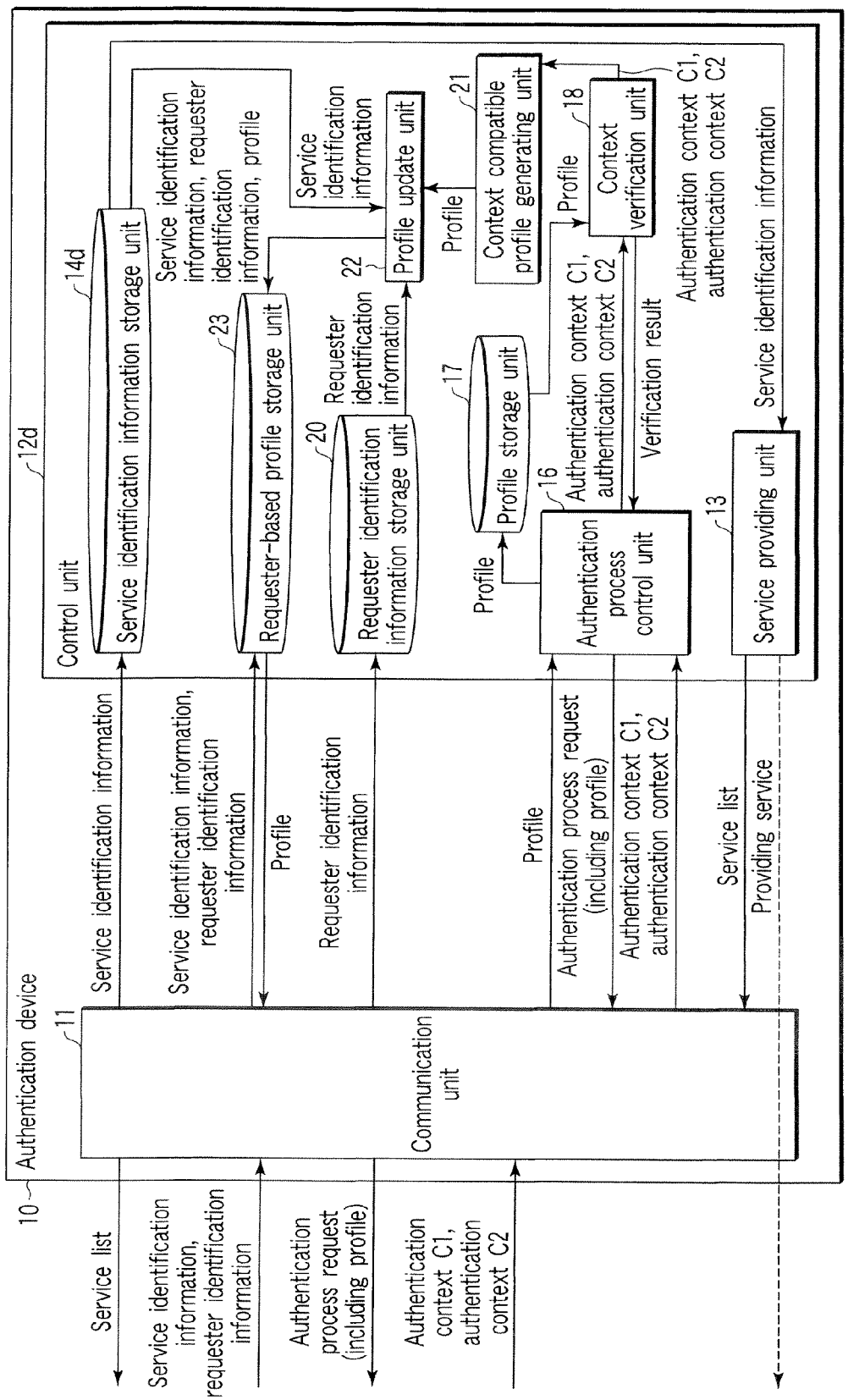
FIG. 30 is a schematic view depicting a configuration of an authentication device in the embodiment.
Figure 31:
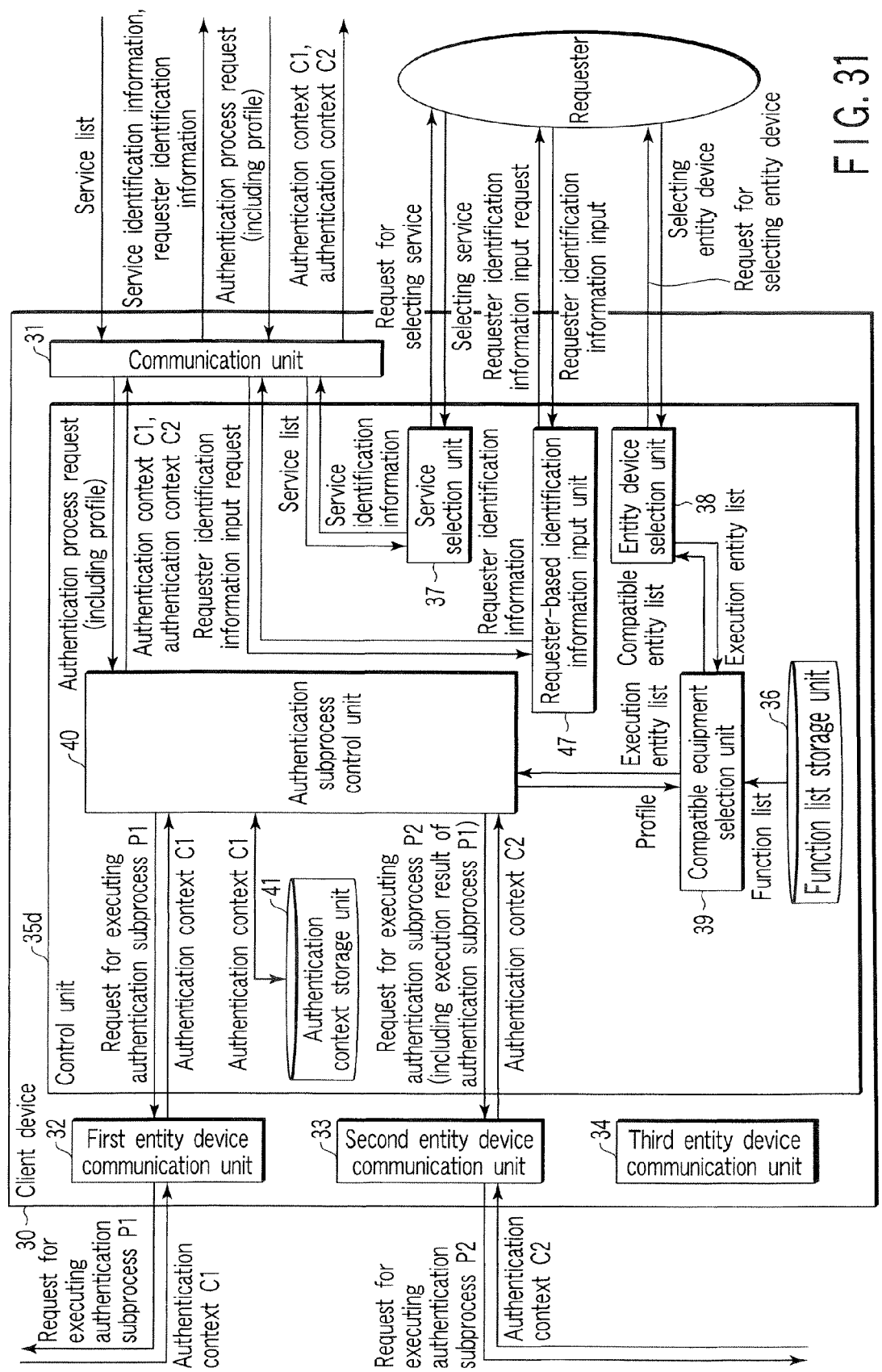
FIG. 31 is a schematic view depicting a configuration of a client device in the embodiment.

FIG. 29 is a schematic view depicting a configuration of an authentication system according to a fifth embodiment of the present invention; FIG. 30 is a schematic view depicting a configuration of an authentication device in the same system; and FIG. 31 is a schematic view depicting a configuration of a client device in the same system.

The present embodiment is provided as an example of an authentication system capable of updating an acceptable profile specified by an authentication device 10 to a profile adaptive to a requester's execution environment.

In the authentication device 10, a communication unit 11 has: a function of transmitting a service list received from a service providing unit 13 to a client device 30; a function of acquiring service identification information and requester identification information from the client device 30; a function of sending out the received service identification information and requester identification information to a profile storage unit 17 and the received service identification information to a service identification information storage unit 14d; a function of sending out a profile acquired from the profile storage unit 17 to an authentication process control unit 16; a function of transmitting to the client device 30 an authentication process request including a profile, the request having been acquired from the authentication process control unit 16; and a function of receiving authentication contexts C1 and C2 from the client device 30.

A service identification information storage unit 14d has: a function of storing (memorizing) service identification information acquired from the communication unit 11 in a storage device (not shown); a function of sending out service identification information to be stored, in response to a request from the service providing unit 13; and a function of storing storage service identification information in a memory device in response to a request from a requester-based service compatible profile list.

A context verification unit 18, in addition to the function described previously, has a function of sending out authentication contexts C1 and C2 acquired from an authentication process control unit 16 to a context compatible profile generating unit 21.

A requester identification information storage unit 20 has: a function of storing requester identification information acquired from the communication unit 11 in a storage device (not shown); and a function of sending out storage requester identification information in response to a request from a requester-based service compatible profile list.

A context compatible profile generating unit 21 has; a function of generating profiles compatible with authentication contexts C1 and C2 acquired from the context verification unit 18; and a function of sending out the generated profile to a profile update unit 22.

The profile update unit 22 has a function of sending out to a requester-based profile storage unit 23 the service identification information acquired from the service identification information storage unit 14d, the profile acquired from the context compatible profile generating unit 21; and the requester identification information acquired from the requester identification information storage unit 20, and then, requesting profile updating.

The requester-based profile storage unit 23 has a function of storing in a storage device (not shown) a requester-based service compatible profile list in which service identification information and profile information have been associated with each other for each item of requester identification information. The requester-based profile storage unit 23 is equivalent to the service identification information and the profile information being stored after being associated with each other for each item of requester identification information in the service compatible profile storage unit 15 described previously. In addition, the requester-based profile storage unit 23 has: a function of sending out to the communication unit 11 the profile compatible with the service identification information acquired from the communication unit 11 from the service compatible profile list compatible with the requester identification information acquired from the communication unit 11; and a function of updating the profile compatible with the service identification information acquired from the profile update unit 22 to the profile acquired from the profile update unit 22 from the service compatible profile list compatible with the requester identification information acquired from the profile update unit 22.

Here, with respect to the requester-based service compatible profile list, for example, as shown in FIG. 32, a service compatible profile list is associated with each requester.

In the client device 30, a communication unit 31 has: a function of receiving a service list from the authentication device 10; a function of sending out the received service list to a service selection unit 37; a function of sending out a requester identification information input request to a requester identification information input unit 47; a function of transmitting service identification information acquired from the service selection unit 37 and requester identification information acquired from the requester identification information input unit 47 to the authentication device 10; a function of receiving an authentication process request from the authentication device 10; a function of sending out the received authentication process request to an authentication subprocess control unit 40; and a function of transmitting to the authentication device 10 the authentication contexts C1 and C2 acquired from the authentication subprocess control unit 40.

The requester identification information input unit 47 comprises: a function of requesting a requester to input requester identification information; and a function of sending out the inputted requester identification information to the communication unit 31.

Figure 33:
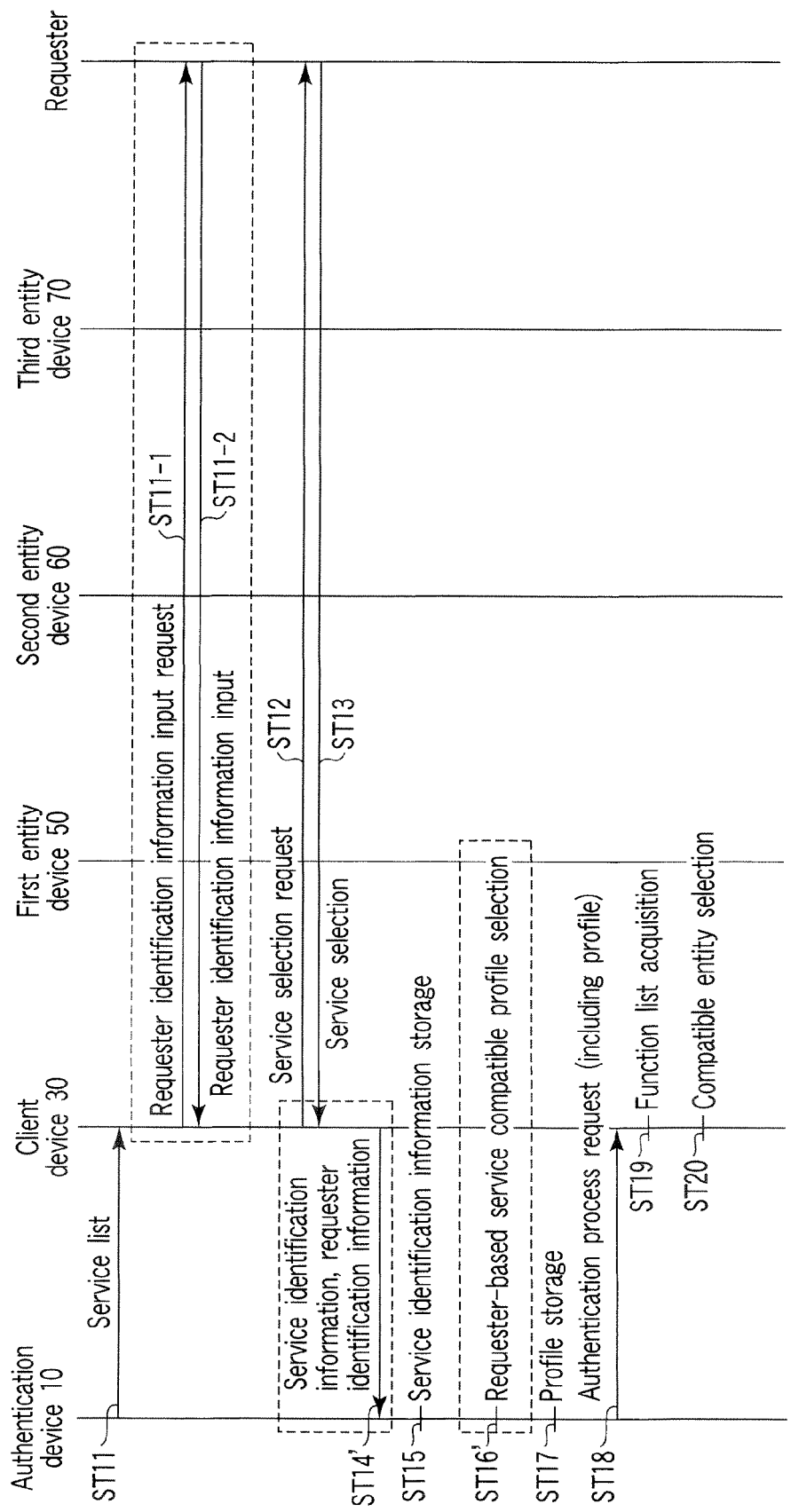
FIG. 33 is a sequence chart for explaining an operation in the embodiment.

Now, an operation of the authentication system configured as above will be described with reference to sequence charts shown in FIGS. 33 and 34.

In the authentication device 10, a service providing unit 13 transmits a service list to the client device 30 through the communication unit 11 (ST11).

In the client device 30, the communication unit 31 displays a requester identification information input request message on a display unit (not shown), so as to prompt a user to input requester identification information (ST11-1), and then, acquires the requester identification information from the requester identification information input unit 47 (ST11-2) by a user's operation.

Then, the communication unit 31 sends out the service list received from the authentication device 10 to the service selection unit 37, and then, acquires service identification information in the same manner as that described previously (ST12, ST13). Then, the communication 31 transmits the acquired service identification information and requester identification information to the authentication unit 10 (ST 14').

In the authentication device 10, a service identification information storage unit 14 receives service identification information through the communication unit 11, and then, stores the thus received service identification information (ST15).

In addition, in the authentication device 10, a requester-based profile storage unit 23 selects the corresponding profile from the requester-based service compatible profile list, based on the service identification information and requester identification information acquired from the communication unit 11 (ST16'), and transmits the selected profile to the client device 30 through the communication unit 11.

Hereinafter, the processing operations from steps ST17 to ST34 are identical to those according to the first embodiment. A duplicate description is omitted here.

After terminating authentication context verification in step ST34, in the case where verification of the authentication contexts C1 and C2 has been successful, a context verification unit 18 sends out the authentication contexts C1 and C2 to a context compatible profile generating unit 21.

The context compatible profile generating unit 21 generates a profile from the acquired authentication contexts C1 and C2, and then, sends out the generated profile to the profile update unit 22.

The profile update unit 22 sends out to a requester-based profile storage unit 23 the service identification information acquired from the service identification information storage unit 14; the profile acquired from the context compatible profile generating unit 21; and the requester identification information acquired from the requester identification information storage unit 20, and then, requests profile updating.

The requester-based profile storage unit 23 updates a profile compatible to the service identification information acquired from the profile update unit 22 to a profile acquired from the profile update unit 22 from a service compatible profile list compatible with the requester identification information acquired from the profile update unit 22 (ST34-1).

Then, the context verification unit 18 transmits a verification result of step ST34 to an authentication process control unit 16.

The authentication process control unit 16 prompts the service providing unit 13 to start service when this verification result indicates principal confirmation. The service providing unit 13 provides service to a requester by this prompt (ST35).

As has been described above, according to the present embodiment, in addition to functions of the first invention, the authentication device 10 stores profile information compatible with requester identification information and service identification information, and then, updates the thus stored profile information to profile information having defined an execution environment included in an authentication context after verification of the authentication context. In this manner, a requester-desired security level can be set with respect to authentication.

Therefore, even in the case where a desired security level is different from one another between a requester and a verifier, convenience and adaptability can be improved.

In addition, for example, like a transfer service in online banking or a settlement request in online shopping, efficient authentication can be provided to service that validates utilization of individual property depending on an authentication result.

Sixth Embodiment

Figure 35:
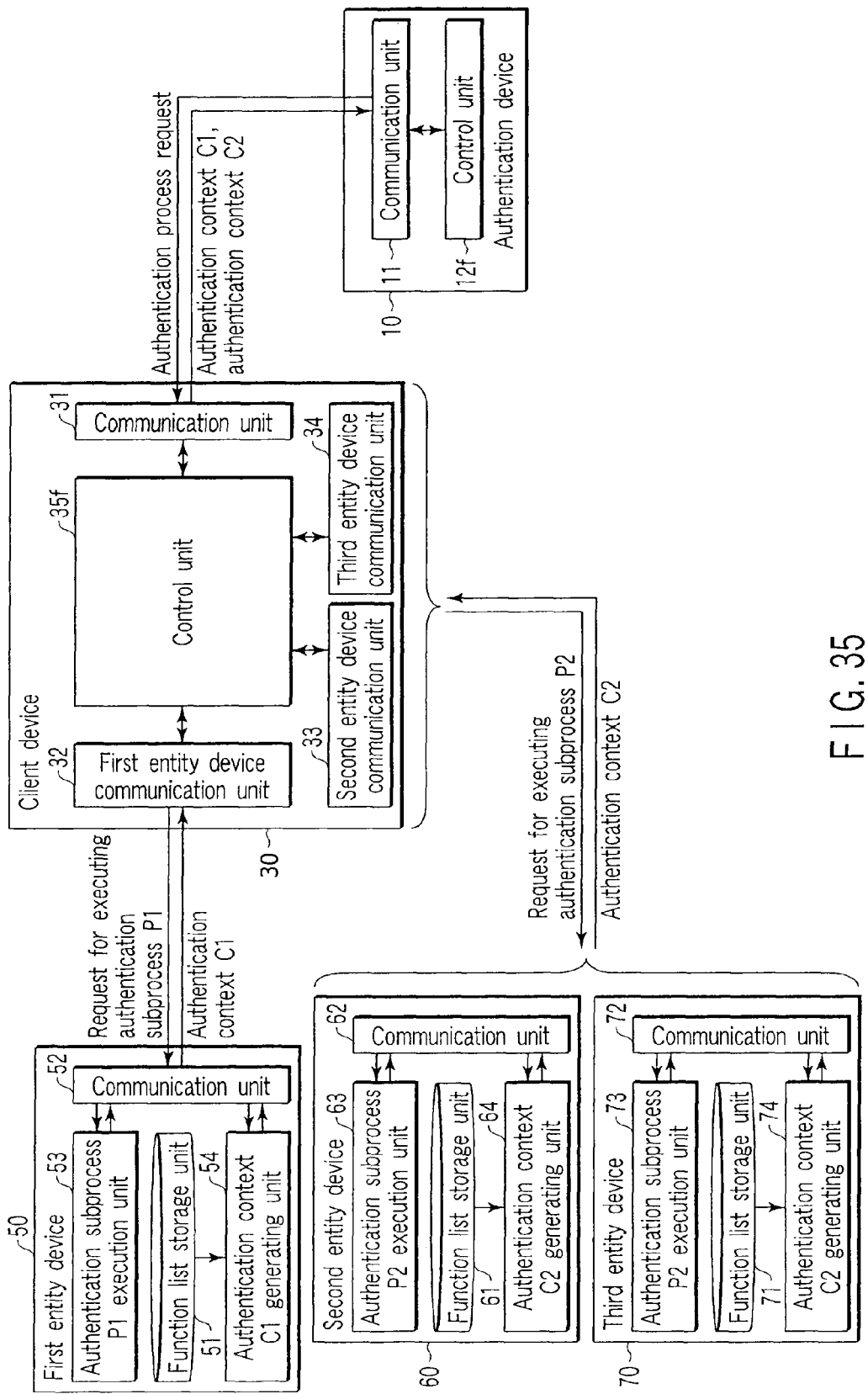
FIG. 35 is a schematic view depicting a configuration of an authentication system according to a sixth embodiment of the present invention.
Figure 37:
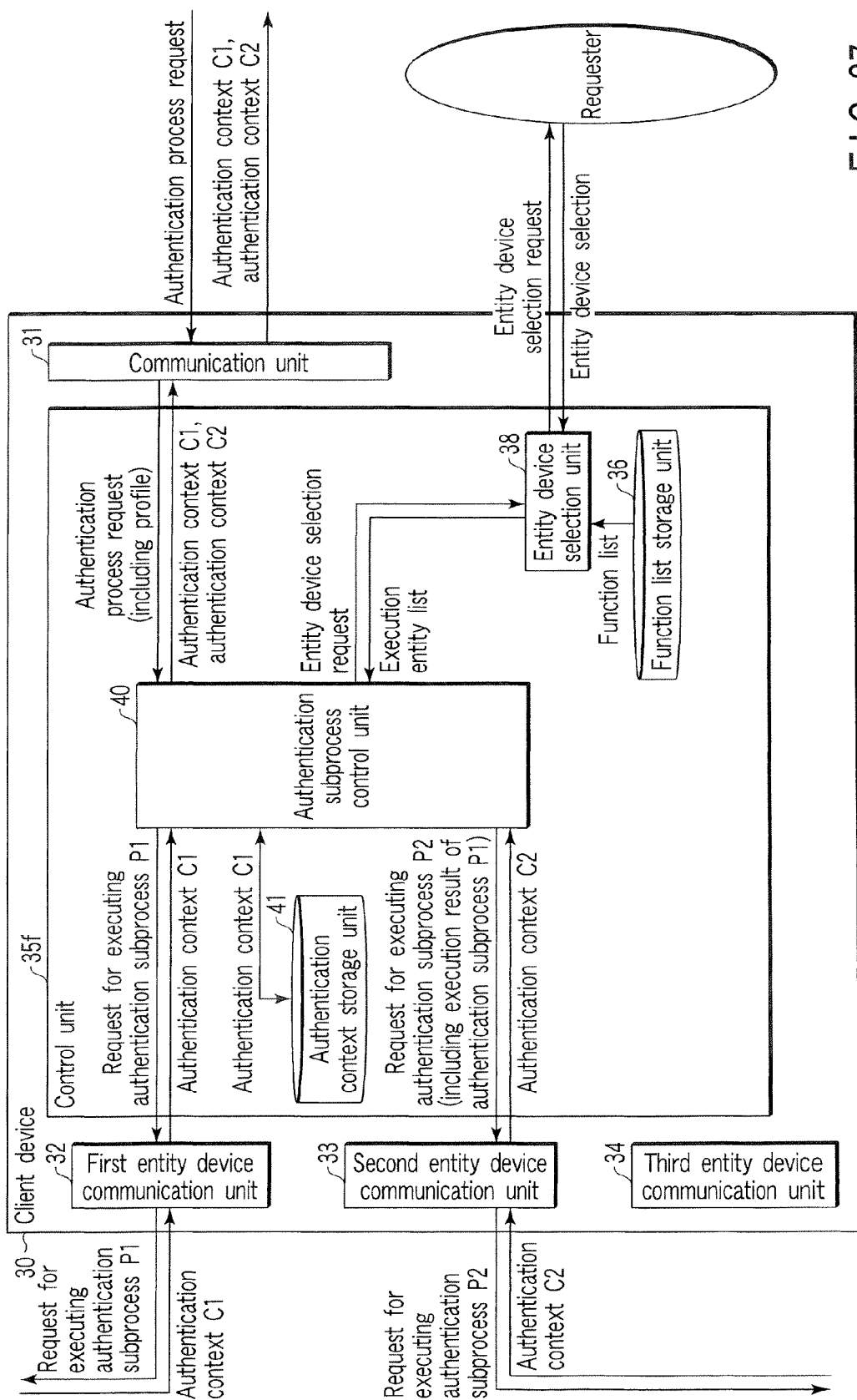
FIG. 37 is a schematic view depicting a configuration of a client device in the embodiment.

FIG. 35 is a schematic view depicting a configuration of an authentication system according to a sixth embodiment of the present invention; FIG. 36 is a schematic view depicting a configuration of an authentication device in the same system; and FIG. 37 is a schematic view depicting a configuration of a client device in the same system.

The present embodiment is provided as an example of an authentication system in the case where an authentication device 10 automatically judges a service level of a service to be provided, in accordance with an entity device for use in authentication process.

In the authentication device 10, a communication unit 11 has: a function of transmitting an authentication process request acquired from an authentication process control unit 16 to a client device 30; a function of receiving authentication contexts C1 and C2 from the client device 30; and a function of sending out the received authentication contexts C1 and C2 to an authentication process control unit 16$f$.

The authentication process control unit 16$f$ has: a function of generating an authentication process request; a function of sending out to a context verification unit 18$f$ the authentication contexts C1 and C2 acquired from the communication unit 11; a function of acquiring a verification result and a service level from the context verification unit 18$f$; and a function of, in the case where the acquired verification result is successful, sending out the service level to a service providing unit 13$f$.

The context verification unit 18$f$ has: a function of verifying the authentication contexts C1 and C2 acquired from the authentication process control unit 16$f$; a function of sending out the acquired authentication contexts C1 and C2 to a service level selection unit 25; and a function of sending out to the authentication process control unit 16*f* the service level acquired from the service level selection unit 25 together with a verification result.

A service level compatible profile list storage unit 24 has: a function of storing (memorizing) a service level compatible profile list in advance in a storage device (not shown); and a function of sending out a stored service level compatible profile list in response to a request from the service level selection unit 25.

Here, in the service level compatible profile list, as shown in FIG. 38, for example, a profile acceptable to each service level is specified. In addition, in the service level compatible profile list, a plurality of profiles acceptable to each service level may be specified.

The service level selection unit 25 has a function of selecting a service level with which the authentication contexts C1 and C2 acquired from the context verification unit 18*f* are adaptive and a profile acceptable at the highest service level is compatible, from the service level compatible profile acquired from the service level compatible profile list storage unit 24; and a function of sending out the thus selected service level to the context verification unit 18*f*.

The service providing unit 13*f* is intended to provide to a requester the service of the service level acquired from the authentication process control unit 16.

In the client device 30, a communication unit 31 has: a function of receiving an authentication process request from the authentication device 10; a function of sending out the thus received authentication process request to an authentication subprocess control unit 40; and a function of transmitting to the authentication device 10 the authentication contexts C1 and C2 acquired from the authentication subprocess control unit 40.

An entity device selection unit 38 has: a function of generating a compatible entity list listing all of entity devices 50 to 70 connected to the client device 30 for each authentication subprocess, based on a function list acquired from a function list storage unit 36; a function of causing a requester to select, on a one by one basis, entity devices that execute authentication subprocesses, from the thus generated compatible entity list; a function of generating an execution entity list from the entity devices that execute authentication subprocesses selected by the requester; and a function of sending out the thus generated execution entity lists to the authentication subprocess control unit 40. Here, in the case where there exist a plurality of authentication subprocess combinations, the entity device selection unit 38 causes the requester to select the authentication subprocess combination and the entity device.

Figure 39:
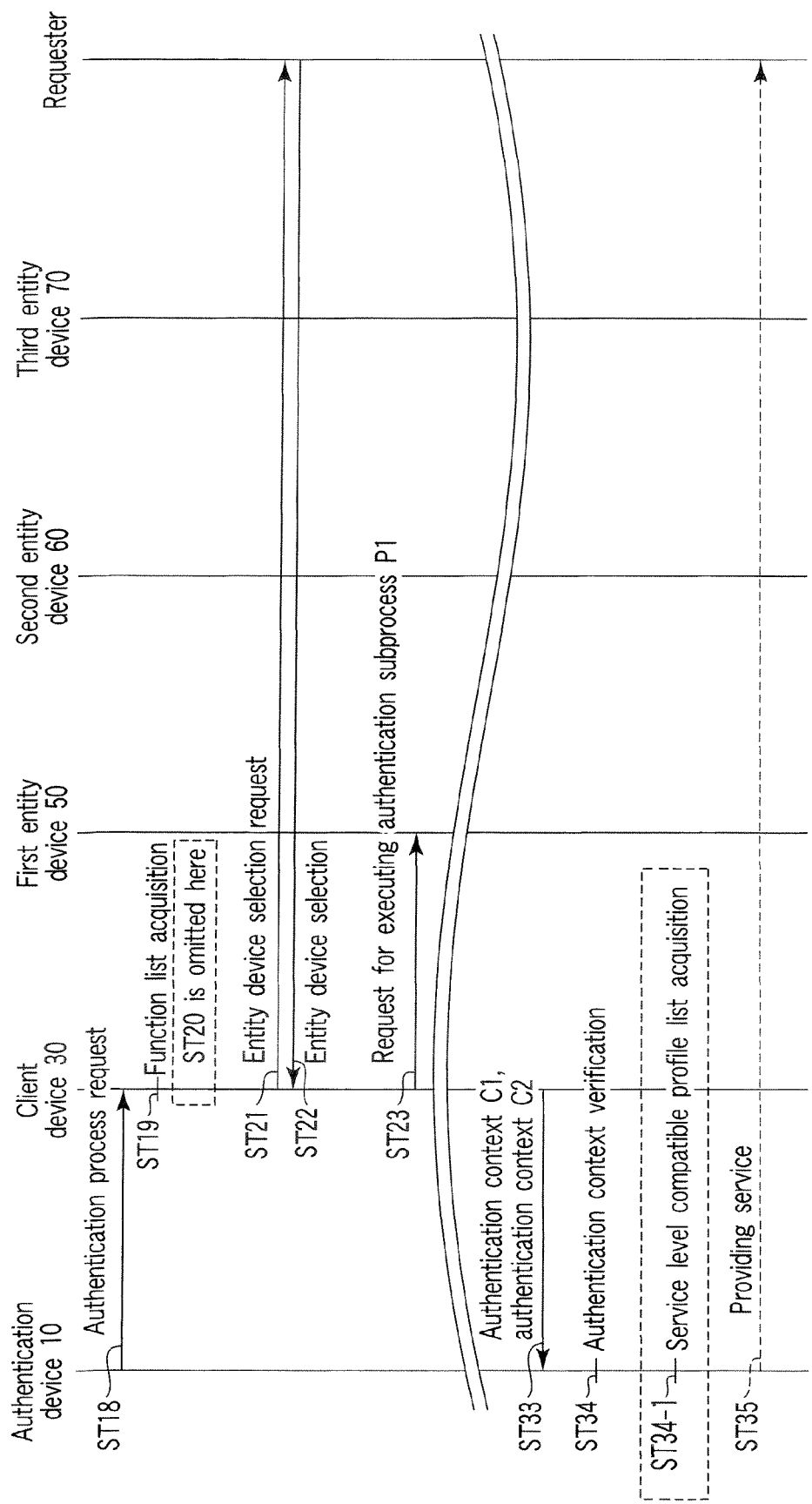
FIG. 39 is a sequence chart for explaining an operation in the embodiment.

Now, an operation of the authentication system configured as above will be described with reference to a sequence chart shown in FIG. 39.

In the authentication device 10, the authentication process control unit 16*f* generates an authentication process request, and then, transmits the generated request to the client device 30 through the communication unit 11 (ST18).

In the client device 30, upon the receipt of an authentication process request, the authentication subprocess control unit 40 transmits the entity device selection request to the entity device selection unit 38.

The entity device selection unit 38 generates a compatible entity list based on a function list acquired from a function list storage unit 36, and then, displays an entity device selection request message on a display unit (not shown), so as to cause a requester to select entity devices on a one by one basis from the generated compatible entity list with respect to each authentication subprocess (ST21). Here, in the case where there exist a plurality of authentication subprocess combinations, the entity device selection unit 38 causes the requester to select an entity device together with the authentication subprocess combination.

When one entity device is selected by a user operation (ST22), the entity device selection unit 38 generates an execution entity list indicating this selection result, and then, sends out the generated execution entity list to the authentication subprocess control unit 40.

Subsequently, an operation from steps ST23 to ST33 is executed in the same manner as that in the first embodiment.

The authentication process control unit 16*f* sends out to the context verification unit 18*f* authentication contexts C1 and C2 acquired from the communication unit 11.

While the context verification unit 18*f* verifies these authentication contexts C1 and C2 (ST34), it sends out the authentication contexts C1 and C2 to the service level selection unit 25.

The service level selection unit 25 refers to a service level compatible profile acquired from the service level compatible profile list storage unit 24 (ST34-1); selects a service level with which the authentication contexts C1 and C2 acquired from the context verification unit 18*f* are adaptive and a profile acceptable at the highest service level is compatible, and then, sends out the thus selected service level to the context verification unit 18*f*.

The context verification unit 18*f* sends out the acquired service level to the authentication process control unit 16*f* together with the verification result.

In the case where the acquired verification result is successful, the authentication process control unit 16*f* sends out the acquired service level to the service providing unit 13*f*.

The service providing unit 13*f* executes a service providing process of the acquired service level to a requester (ST35).

As has been described above, according to the present embodiment, in addition to the advantageous effect of the first embodiment, based on profile information included in each authentication context, the authentication device 10 selects the highest service level from among the service levels compatible with the corresponding profile information. Thus, even in the case where profiles are different depending on service levels, convenience and adaptability can be improved.

Additionally, the authentication device 10 can select a compatible service level based on an authentication context, thus making it possible for the authentication device 10 to automatically judge and provide service of a level adaptive to a requester's execution environment.

In this manner, for example, in online banking service, in the case where authentication has been carried out by an entity device with a low security level, the device being attached to a cellular phone, a service of a low transfer amount limit can be provided. In addition, in the case where authentication has been carried out by an entity device with a high security level, the device being attached to an ATM, a service of a high transfer amount limit can be provided. In this manner, the authentication device 10 can provide service by automatically making judgment without the requester considering a relationship between a security level and a service level. Therefore, the requester's convenience can be remarkably improved.

The method exhibited in each above-mentioned embodiment can be distributed as a computer executable program by storing into a storage medium such as a magnetic disk [floppy™ disk, hard disk, etc.], an optical disk (CD-ROM, DVD, etc.), a magnet-optical disk (MO) and a semiconductor memory.

Regardless of type of storage format, any storage medium capable of storing the program and being read by the computer is usable as the storage medium for this program.

An operating system (OS) or middleware (MW) such as a database management software and a network software running on the computer, based on the instruction installed in the computer from the storage medium, may executes a part of each processing to achieve each above-described embodiment.

The storage medium for the invention is not limited to a medium independent from the computer, and includes the storage medium with a program transmitted via a LAN, the Internet, etc., downloaded and stored or temporarily stored thereon.

The number of the storage medium for the invention is not limited only one, and the storage medium of the invention includes the case that processing in each embodiment is respectively executed by means of a plurality of media, and any structure of the medium is acceptable.

The computer in the invention executes each processing in each above mentioned embodiment, based on the program stored in the storage medium. Any configuration of the computer such as a device composed of a single personal computer, etc., and a system composed of a plurality of devices network-connected therein are available.

The computer in the invention is not limited to a personal computer, and includes computing processing device, a micro-computer, etc., included in information processing equipment and generically means equipment and a device capable of achieving the functions of the invention.

The invention in its broader aspects is not limited to the specific details and representative embodiments shown and described herein, and can be embodied in their implementation phases by modifying constituent components without departing from the spirit or scope of the general inventive concept of the invention. A variety of modifications of the invention may be made by appropriate combinations of a plurality of constituent components shown in each foregoing embodiment. For example, some constituent components may be omitted from the whole of the constituent components shown in each embodiment. Furthermore, the constituent components over different embodiments can be appropriately combined.

What is claimed is:

1. An authentication device communicable with a client device in an open network environment with respect to a plurality of authentication entity devices capable of individually executing an authentication subprocess that configures a biometric authentication processing operation and the client device to which said each authentication entity device is to be connected, the authentication device comprising:

a service compatible profile storage module configured to store profile information defining an execution environment acceptable to each service by service identification information indicating each service;

a profile transmitting module configured to transmit to the client device the corresponding profile information in the service compatible profile storage module, based on the service identification information received from the client device;

an authentication context receiving module configured to receive from the client device authentication context information including an execution environment and an execution result of the authentication subprocess;

a context verification module configured to verify whether or not the authentication context information is acceptable, based on the transmitted profile information;

a service providing module configured to execute a service providing processing operation compatible with the received service identification information when it is indicated that the verification result is acceptable;

a compatible profile transmitting module configured to transmit all of profile information in the service compatible profile storage module to the client device before receiving the service identification information from the client device;

a compatible profile receiving module configured to receive profile information compatible with an execution environment from the client device; and a corresponding profile information transmitting module configured to transmit corresponding profile information and service identification information in the service compatible profile storage module to the client device, based on profile information received from the client device, wherein profile information compatible with the execution environment is profile information compatible with an execution environment indicated by function list information, among all of the profile information received by the client device, and the authentication context information is information that is generated by said each authentication entity device and transmitted from the client device to the authentication context receiving module after said each authentication entity device that executes said each authentication subprocess has been selected by the client device, from among all authentication entity devices adaptive to the transmitted profile information, based on said function list information stored in advance in the client device, the function list information defining an execution environment of said each authentication entity device.

2. An authentication device communicable with a client device in an open network environment with respect to a plurality of authentication entity devices capable of individually executing an authentication subprocess that configures a biometric authentication processing operation and the client device to which said each authentication entity device is to be connected, the authentication device comprising:

a service compatible profile storage module configured to store profile information defining an execution environment acceptable to each service by service identification information indicating each service;

a profile transmitting module configured to transmit to the client device the corresponding profile information in the service compatible profile storage module, based on the service identification information received from the client device;

an authentication context receiving module configured to receive from the client device authentication context information including an execution environment and an execution result of the authentication subprocess;

a context verification module configured to verify whether or not the authentication context information is acceptable, based on the transmitted profile information; and a service providing module configured to execute a service providing processing operation compatible with the received service identification information when it is indicated that the verification result is acceptable, wherein the authentication context information is information that is generated by said each authentication entity device and transmitted from the client device to the authentication context receiving module after said each authentication entity device that executes said each authentication subprocess has been selected by the client device, from among all authentication entity devices adaptive to the transmitted profile information, based on function list information stored in advance in the client device, the function list information defining an execution environment of said each authentication entity device, and the service compatible profile storage module stores the service identification information and the profile information to be associated with each other by requester identification information indicating a requester;

the profile transmitting module transmits corresponding profile information in the service compatible profile storage module to the client device based on requester identification information and service identification information received from the client device, the authentication device further comprising:

a profile information generating module configured to, when it is indicated that a verification result by the context verification module is acceptable, generate profile information defining an execution environment included in the authentication context, based on the authentication context information; and a profile update module configured to update corresponding profile information in the service compatible profile storage module to the generated profile information, based on the requester identification information and service identification information received from the client device.

3. An authentication device communicable with a client device in an open network environment with respect to a plurality of authentication entity devices capable of individually executing an authentication subprocess that configures a biometric authentication processing operation and the client device to which said each authentication entity device is to be connected, the authentication device comprising:

a service level compatible profile storage module configured to store profile information defining an acceptable execution environment at each service level by service level identification information indicating a service level;

an authentication process request module configured to transmit an authentication process request to the client device;

an authentication context receiving module configured to receive authentication context information that includes an execution environment and an execution result of the authentication subprocess from the client device;

a context verification module configured to verify whether or not the authentication context information is acceptable based on profile information in the service level compatible profile storage module;

a service level selection module configured to, when it is indicated that a verification result is acceptable, select a highest service level from among service levels compatible with corresponding profiles in the service level compatible profile storage module, based on profile information included in said each authentication context; and a level compatible service providing module configured to execute a service providing processing operation compatible with the selected service level.

4. A client device for use in an authentication system comprising:

a plurality of authentication entity devices capable of individually executing authentication subprocesses, each of which configures a biometric authentication processing operation;

a client device to which said each authentication entity device is to be connected; and an authentication device which executes service providing processing operation after verifying authentication context information received from the client device in an open network environment, the client device comprising:

a function list storage module configured to store function list information defining an execution environment of said each authentication entity device;

a service request module configured to, when a service is requested, transmit service identification information to the authentication device;

a profile receiving module configured to receive profile information from the authentication device;

a compatible device selection module configured to select all authentication entity devices adaptive to the received profile information, based on the function list information;

an entity device selection module configured to prompt selection of one or more authentication entity devices which execute one or more said authentication subprocesses, from among all of the authentication entity devices selected by the compatible device selection module;

an authentication subprocess control module configured to transmit a request for executing the authentication subprocess to said each authentication entity device selected by the entity device selection module; and a context transmitting module configured to, when receiving authentication context information that includes an execution environment and an execution result of an authentication subprocess from said each authentication entity device, transmit said each authentication context information to the authentication device, wherein the profile information is profile information that corresponds to service identification information transmitted from the client device, among profile information stored in advance in the authentication device, the profile information defining an execution environment in which each service is acceptable by service identification information indicating each service.

5. The client device according to claim 4, further comprising:

a module configured to, when profile information is received by the profile receiving module, prompt confirmation of whether or not an authentication entity device is newly connected prior to selection by the compatible device selection module;

a function list acquisition request module configured to transmit a function list acquisition request to all of the newly connected authentication entity devices; and a function list writing module configured to, when function list information is received from the authentication entity device in response to transmission of the function list acquisition request, write the function list information into the function list storage module.

6. The client device according to claim 4, further comprising:

a module configured to receive all profile information stored by the authentication device prior to transmitting the service identification information;

a module configured to return to the authentication device profile information compatible with an execution environment indicated by function list information in the function list storage module, among all of the received profile information;

a module configured to receive profile information and service identification information that correspond to the returned profile information from the authentication device; and a module configured to prompt selection of service identification information to be transmitted to the authentication device, based on the received corresponding profile information and service identification information.

* * * * *